US008534440B2

(12) United States Patent
Sudau et al.

(10) Patent No.: US 8,534,440 B2
(45) Date of Patent: Sep. 17, 2013

(54) CLUTCH ARRANGEMENT, IN PARTICULAR FOR THE DRIVE TRAIN OF A VEHICLE

(75) Inventors: Jörg Sudau, Niederwerrn (DE); Rüdiger Lotze, Schweinfurt (DE); Arthur Schröder, Hambach (DE); Angelika Ebert, Schonungen (DE); Michael Kneuer, Uechtelhausen (DE); Gregor Sueck, Sennfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 369 days.

(21) Appl. No.: 12/989,554

(22) PCT Filed: Apr. 17, 2009

(86) PCT No.: PCT/EP2009/054597
§ 371 (c)(1),
(2), (4) Date: Nov. 8, 2010

(87) PCT Pub. No.: WO2009/130166
PCT Pub. Date: Oct. 29, 2009

(65) Prior Publication Data
US 2011/0259702 A1      Oct. 27, 2011

(30) Foreign Application Priority Data

Apr. 23, 2008  (DE) .......................... 10 2008 001 327
Apr. 4, 2009   (DE) .......................... 10 2009 016 414

(51) Int. Cl.
*F16D 25/0638*   (2006.01)
*F16D 13/72*     (2006.01)

(52) U.S. Cl.
USPC ................. 192/85.29; 192/70.12; 192/70.17; 192/85.38; 192/85.39; 192/85.61

(58) Field of Classification Search
USPC .......... 192/55.61, 85.24, 85.29, 85.37–85.39, 192/85.61
See application file for complete search history.

(56) References Cited

U.S. PATENT DOCUMENTS

| 2,927,673 | A | * | 3/1960 | Sand ........................ 192/70.14 |
| 3,171,522 | A |   | 3/1965 | Petrie et al. |

(Continued)

FOREIGN PATENT DOCUMENTS

| DE | 102 42 856     | 3/2004 |
| DE | 11 2006 000 595 | 1/2008 |

(Continued)

*Primary Examiner* — Richard M. Lorence
(74) *Attorney, Agent, or Firm* — Cozen O'Connor

(57) ABSTRACT

A clutch arrangement includes a housing filled with fluid, a first friction surface formation rotatable with the housing around an axis of rotation, a second friction surface formation rotatable with a driven element around the axis of rotation, a pressing element rotatable with the housing around the axis of rotation and which divides an interior space of the housing into a first spatial area and a second spatial area. Depending on fluid pressure in the first and fluid pressure in the second spatial areas, the pressing element is movable with respect to the housing for producing and canceling a frictional engagement between the and the second friction surface formations. A fluid supply system for the first spatial area and/or the second spatial area includes at least a first fluid flow path. The fluid can be supplied to the associated spatial area via at least one fluid flow path and fluid can be removed from the associated spatial area via at least one fluid flow path.

37 Claims, 10 Drawing Sheets

(56) References Cited

U.S. PATENT DOCUMENTS

| | | | |
|---|---|---|---|
| 3,321,999 A | 5/1967 | Greer | |
| 6,098,771 A | 8/2000 | Vu | |
| 6,332,521 B1 | 12/2001 | Shoji | |
| 6,851,531 B2 * | 2/2005 | Sasse | 192/3.29 |
| 2004/0060793 A1 | 4/2004 | Dacho et al. | |
| 2004/0074728 A1 * | 4/2004 | Sasse | 192/3.21 |
| 2005/0224308 A1 | 10/2005 | Hauck et al. | |
| 2005/0284722 A1 | 12/2005 | Heinrich et al. | |
| 2007/0039796 A1 * | 2/2007 | Schroder et al. | 192/85 AA |
| 2009/0050437 A1 | 2/2009 | Fujita | |

FOREIGN PATENT DOCUMENTS

| | | |
|---|---|---|
| EP | 15 84 830 | 10/2005 |
| EP | 1 610 018 | 12/2005 |
| WO | WO 2006/100966 | 9/2006 |

* cited by examiner

Fig. 14
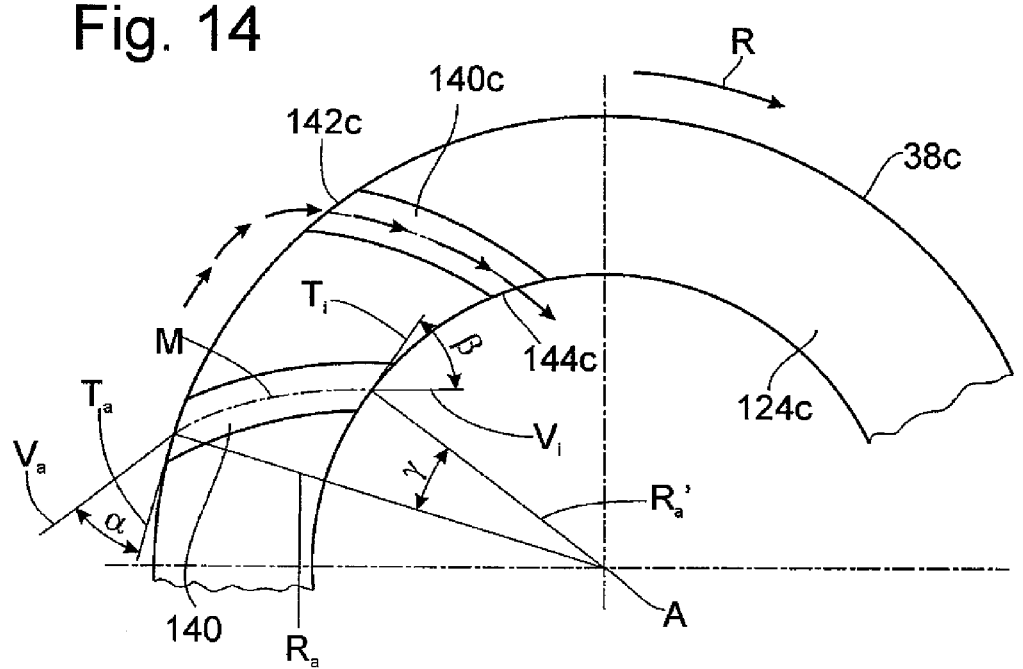
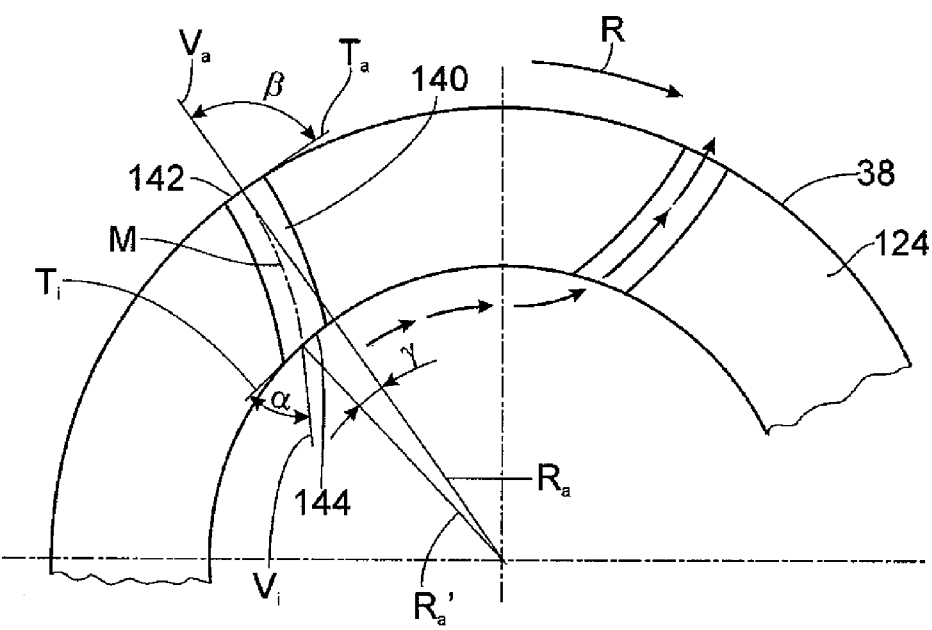
Fig. 15

US 8,534,440 B2

CLUTCH ARRANGEMENT, IN PARTICULAR FOR THE DRIVE TRAIN OF A VEHICLE

PRIORITY CLAIM

This is a U.S. national stage of Application No. PCT/EP2009/054597, filed on Apr. 17, 2009, which claims priority to German Application Nos. 10 2008 001 327.7.7, filed: Apr. 23, 2008 and 10 2009 016 414.6 filed Apr. 4, 2009, the contents of which are incorporated herein by reference.

BACKGROUND OF THE INVENTION

1. Field of the Invention

The present invention is directed to a clutch arrangement for use in the drivetrain of a vehicle for the transmission of torque between a drive unit and a transmission, particularly an automatic transmission such as a multiple-speed automatic transmission or an automatic transmission with a continuously variable transmission ratio.

2. Related Art

In vehicles outfitted with an automatic transmission, the torque is generally transmitted between the drive unit and the transmission via a hydrodynamic torque converter. A hydrodynamic torque converter of this type can increase the torque delivered by a drive unit particularly in the starting state, i.e., in a state in which a lockup clutch of the converter is not engaged. At the same time, however, a hydrodynamic torque converter limits the speed that is possible in the starting state owing to its hydrodynamic characteristics. Due to the fact that modern drive units have comparatively high torques, i.e., torque conversion functionality is basically no longer required in the starting state, the torque limiting of a hydrodynamic torque converter in the starting state is perceived as problematic because it rules out sporty starting processes on the one hand and, on the other hand, makes it impossible to obtain higher outputs which can generally be achieved at higher rotational speeds. Further, hydrodynamic torque converters are comparatively complicated and costly systems owing to the hydrodynamic circuit contained therein and the components required for the hydrodynamic circuit, particularly the pump, turbine and stator.

SUMMARY OF THE INVENTION

It is an object of the present invention to provide a clutch arrangement, particularly for the drivetrain of a vehicle, whose construction can be realized in a simple manner and which can be controlled in a correspondingly simple manner without introducing the limitations in the starting state that are typical of hydrodynamic torque converters.

According to one embodiment of the invention, a clutch arrangement, particularly for the drivetrain of a vehicle, comprises a housing which is filled, or can be filled, with fluid, a first friction surface formation rotatable with the housing around an axis of rotation, a second friction surface formation rotatable with a driven element around the axis of rotation, a pressing element rotatable with the housing around the axis of rotation and which divides an interior space of the housing into a first spatial area and a second spatial area, wherein, depending on the fluid pressure in the first spatial area and the fluid pressure in the second spatial area, the pressing element is movable with respect to the housing for producing and canceling a frictional engagement between the first friction surface formation and the second friction surface formation, a fluid supply system for the first spatial area and/or the second spatial area comprising at least a first fluid flow path for the first spatial area and/or at least a second fluid flow path for the second spatial area, wherein fluid can be supplied to the associated spatial area via at least one fluid flow path and fluid can be removed from the associated spatial area via at least one fluid flow path.

A wet clutch arrangement constructed according to one embodiment of the invention, i.e., a system which differs in principle from a hydrodynamic torque converter or a fluid coupling in that torque is transmitted directly, i.e., by mechanical elements, without the use of a circulating fluid between a pump and a turbine, is a two-line type of clutch, for example, in which there are only two fluid flow paths. A fluid flow through the housing is built up via these two fluid flow paths, each of which communicates with one of the spatial areas of the interior space of the housing, and, particularly in a starting state in which heat is generated by the friction surfaces of the two friction surface formations which come into frictional contact with one another, heat is removed from the area of these friction surfaces and from the interior of the housing by this fluid flow. At the same time, the differential fluid pressure between the two spatial areas can be adjusted by these two fluid flow paths in such a way that a sufficient torque can also be transmitted in the starting state by the wet clutch arrangement without any limiting of the permissible driving speed of a drive unit in the starting state.

The wet clutch arrangement according to one embodiment of the invention is constructed in a simple manner. A fluid supply system which is arranged, for example, in an automatic transmission can also be designed in a correspondingly simple manner when, e.g., two fluid flow paths are provided which, depending upon the operating state, produce a connection to a source for fluid under pressure, i.e., for example, a pump or a substantially pressureless fluid reservoir, i.e., the oil sump in an automatic transmission, for example. The fluid supply system is for example, the two-line type having a fluid flow path each for the first spatial area and the second spatial area.

In order to allow fluid to flow through the housing and, accordingly, to remove heat from the area of the housing, also when the pressing element carries out a fluid-tight separation of the two spatial areas on principle, it is suggested that at least one through-opening is provided in the pressing element for the exchange of fluid between the first spatial area and the second spatial area.

Also, when the fluid supply system is designed as a three-line type with a fluid flow path for the second spatial area and two fluid flow paths for the first spatial area, a comparatively simple construction can be realized in which the transmission of high torques can also be achieved with very little frictional or thermal loading of the different components which enter into frictional interaction with one another.

In one embodiment the fluid supply system is a single-line type with one fluid flow path for the second spatial area. In this way, an exchange of fluid is provided only for the second spatial area so that the clutch arrangement can be engaged and disengaged by a corresponding variation in fluid pressure therein and a corresponding application of the pressing element.

In one embodiment the fluid supply system is the expanded two-line type with a fluid flow path for the second spatial area and a fluid supply path and a fluid discharge path for the first spatial area.

For example, at least the second friction surface formation, advantageously also the first friction surface formation, can be arranged in the first spatial area.

The coupling of the pressing element with the housing can be realized, for example, by an axially elastic coupling arrangement which produces a connection, which is substantially fixed with respect to relative rotation, and which also ensures the axial movability of the pressing element required for the engagement and release of the clutch arrangement.

For example, the coupling arrangement can comprise a plurality of leaf springs.

In one embodiment, which is especially advantageously economical with respect to energy, it is suggested that a preloading arrangement is associated with the pressing element, which preloading arrangement preloads the pressing element in the direction in which the frictional engagement of the first friction surface formation with the second friction surface formation is produced. A clutch arrangement of this kind is the normally closed type. Owing to the preloading action of the preloading arrangement, regardless of the differential fluid pressure between the two spatial areas, the clutch arrangement is fundamentally in a torque transmitting state so that in a normal driving state in which the wet clutch arrangement need not be released or engaged again, particularly when combined with an automatic transmission, only a comparatively small differential pressure, if any, need be built up between the two spatial areas in order to transmit the driving torque delivered by the drive unit.

In one embodiment, a preloading arrangement can be associated with the pressing element, which preloading arrangement preloads the pressing element in a direction in which a frictional engagement of the first friction surface formation with the second friction surface formation is canceled. Accordingly, the clutch arrangement is designed in this case as a normally open clutch type. In this instance, a differential fluid pressure between the two spatial areas must be built up permanently in the driving state to keep the clutch arrangement engaged. However, in a starting phase, i.e., also when starting a drive unit, this clutch arrangement interrupts the torque transmission connection already before the automatic transmission so that controlling measures need not be undertaken beforehand to ensure that no gear is engaged in the automatic transmission, i.e., a torque transmission connection is interrupted in the region of the automatic transmission.

In one embodiment, which is very easy to implement in terms of construction, it is suggested that the preloading arrangement comprises the axially elastic coupling arrangement. In other words, a merging of functions is realized in one and the same assembly.

Alternatively or in addition, it is possible that the preloading arrangement comprises a disk spring unit which axially preloads the piston element with respect to the housing.

In order to prevent the formation or transmission of torsional vibrations or rotational irregularities in a drivetrain also in a wet clutch constructed according to the invention, it is suggested that the second friction surface formation is coupled with the driven element by a torsional vibration damper arrangement for rotation around the axis of rotation.

Further, the torsional vibration damper arrangement can be arranged in the first spatial area, and in order to provide a structurally very compact construction, the torsional vibration damper arrangement can radially overlap the first friction surface formation and/or the second friction surface formation at least partially.

Further, according to a particularly advantageous embodiment, there is at least one delivery element for generating an internal fluid circulation. By generating an internal fluid circulation in this way, it is ensured that heat developing primarily when the friction surface formations move in such a way that their friction surfaces slide relative to one another under slippage conditions can be removed from this area.

To achieve a uniform distribution of the fluid circulation in the circumferential direction around the axis of rotation, it is suggested that a plurality of delivery elements are provided successively in circumferential direction.

At least one delivery element can comprise a delivery surface which is rotatable with the housing around the axis of rotation and that extends radially and axially. It should be noted that a radial or axial extension of a surface of this kind does not necessarily mean that the surface has a surface component which extends exactly in radial or axial direction. It is obvious that a radially and axially extending delivery surface of this kind can also mean a surface that is oriented in alignment with a radial line and in axial direction.

In one embodiment that can be realized in a particularly simple manner, especially when the pressing element is connected to the housing so as to rotate together with it around the axis of rotation, the delivery surface is preferably provided at least partially at the pressing element.

Further, the construction can be carried out in such a way that the second friction surface formation comprises a friction element connected to the pressing element and the delivery surface is provided at least partially at the friction element and/or at an intermediate element connecting the friction element to the pressing element. Accordingly, in this case, as an alternative to a variant in which the pressing element is itself also a part of the second friction surface formation and can frictionally interact with the first friction surface formation, a multiple-part construction is provided in which the friction element is either connected directly to the pressing element or an intermediate element produces the connection. In this case, the delivery surface can be provided at least partially at the friction element and/or at the intermediate element.

Further, in order to optimize the geometry of a delivery surface of this kind, the delivery surface can be provided, for example, on at least two of the elements including the pressing element, the friction element and, if any, the connection element.

At least one delivery element can be constructed as an integral component part of the housing and/or can be provided at a delivery member secured to the housing.

It is also possible that the delivery element forms an integral component part of the pressing element and/or of a friction element of the second friction surface formation connected to the pressing element and/or of an intermediate element connecting the friction element to the pressing element and/or is provided at a delivery member that is fixedly connected thereto.

Constructing as an integral component part offers the advantage that the quantity of structural component parts is reduced. Providing a delivery element at a delivery member which is to be arranged separately offers a greater freedom in laying out the geometry of the delivery element or of a delivery surface, also with regard to the geometry to be provided for a structural component part supporting the delivery member.

It can also be provided, for example, that at least one friction surface formation of the first friction surface formation and second friction surface formation comprises at least one friction element with at least one friction lining providing a friction surface, and that at least one opening for the passage of fluid is provided in at least one friction lining.

In order to provide for a sufficient cooling action also when there are comparatively large differences between the input rotational speeds and output rotational speeds, particularly at a very low output rotational speed, it is proposed that a fluid flow generated by the internal fluid circulation is at least twice as great as a fluid flow in and out of the first spatial area generated by the fluid supply system for the first spatial area at a rotational speed of the housing in the range of 2000 rpm and at a rotational speed of the driven element in the range of 0 rpm.

Particularly when the second friction surface formation comprises a friction element connected to the pressing element, it is particularly advantageous when the second spatial area is limited by the pressing element and the friction element and/or a connection element connecting the pressing element to the friction element. Since the pressing element and/or a connection element therefore also limit(s) the second spatial area, the pressure difference between the two spatial areas loads the connection between the pressing element and the friction element or the connection element, if any, correspondingly less when the clutch arrangement is actuated.

To further improve the actuating behavior of the clutch arrangement when producing and canceling the torque transmission state, it is further suggested that at least one friction surface formation of the first friction surface formation and second friction surface formation, preferably the second friction surface formation, comprises at least one axially elastic friction element, preferably with an undulating and/or plate-like shape.

In order to provide adequate cooling fluid, particularly to the area in which heat can be generated through frictional contact, i.e., the area of the friction surface formations, it is further suggested that the pressing element has at least one opening for supplying fluid to the area of the friction surface formations. This is particularly advantageous when, as was mentioned above, the construction is carried out in such a way that a fluid circulation is built up primarily under slippage conditions, i.e., during relative rotation of the two friction surface formations with respect to one another, so as to circulate around these friction surface formations.

In order to increase the torque that can be transmitted by increasing the total effective surface, it is suggested that at least one friction surface formation of the first friction surface formation and second friction surface formation comprises a plurality of friction elements.

In one advantageous embodiment, it is suggested that the volume of the first spatial area is greater than the volume of the second spatial area, and that fluid can be supplied to the second spatial area via the second fluid flow path to produce the frictional engagement of the friction surface formations. In this way, it is ensured that the spatial area having the smaller total volume is supplied with fluid for engaging the clutch arrangement. As a result, engagement processes can be carried out appreciably faster, above all when the housing is only partially filled with fluid in the starting phase.

One embodiment of the present invention is further directed to a drive system for a vehicle comprising a drive unit, an automatic transmission and a clutch arrangement according to the invention in the torque transmission path between the drive unit and the automatic transmission.

When the clutch arrangement in a drive system of this type is constructed as a normally closed type clutch, it can be provided that a clutch torque which can be generated by the preloading action of the preloading arrangement is greater than a maximum driving torque of the drive unit. This means that a fluid feed into the housing is not required on principle in the driving state. On the one hand, the clutch torque which can be generated by the preloading arrangement itself is defined in such a way that the maximum driving torque can also be transmitted and, therefore, there is no need to assist this by a differential fluid pressure. On the other hand, the system does not enter a slip state in which heat is generated which would have to be removed through a fluid flow.

In an alternative design of the drive system, it can be provided that a clutch torque, which can be generated by the preloading action of the preloading arrangement, is less than a maximum driving torque of the drive unit. Accordingly, in this case, it is necessary on principle to assist the clutch torque which can be generated by the preloading arrangement by a differential fluid pressure in the driving state, that is, at least when the driving torque of the drive unit is above, or within the range of, the clutch torque which can be generated by the preloading arrangement. While this is somewhat unfavorable with respect to energy because a corresponding differential fluid pressure must be built up during certain phases in the driving state, this design makes it possible, on the other hand, for the wet clutch arrangement to be released appreciably faster in the starting phase because only a slight differential fluid pressure must be built up in order to move the piston element in the releasing direction against the preloading action of the preloading arrangement.

Further, it can be provided in a system of this type that a differential fluid pressure is adjusted in such a way between the first spatial area and the second spatial area in a driving state of the drive system that the clutch element of the clutch arrangement has a predetermined safety margin above the actual driving torque of the drive unit. This ensures that the clutch arrangement cannot enter a slip state even when torque fluctuates around the actual driving torque of the drive unit.

For example, it can be provided that the predetermined safety margin is in the range of 5% to 30%, preferably 10% to 20%, of the actual driving torque of the drive unit.

A spring element which exerts a force on the pressing element sufficient to transmit at least a portion of a maximum engine torque can be provided in the drive system according to the invention.

BRIEF DESCRIPTION OF DRAWINGS

The present invention will be described more fully in the following with reference to the accompanying drawings. In the drawings:

FIG. 14 is a schematic partial axial view of a friction element provided with a friction lining; and FIG. 15 is a view corresponding to FIG. 14 showing an alternative construction of the friction element.

DETAILED DESCRIPTION OF THE DRAWINGS

Figure 1:
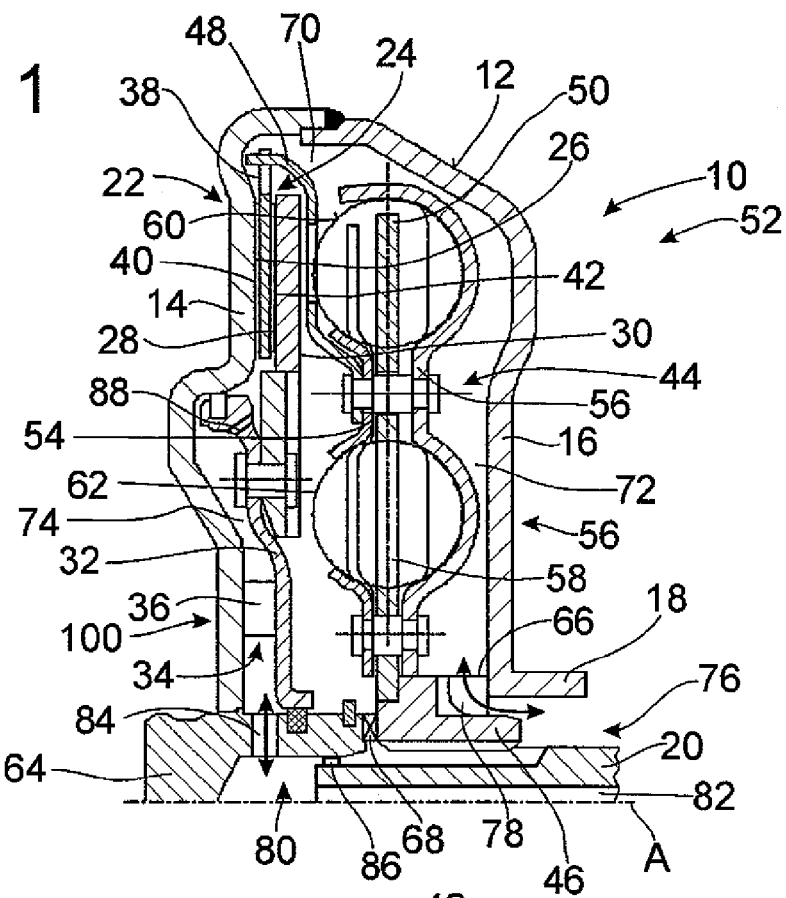
FIG. 1 is a partial longitudinal section through a clutch arrangement according to a first embodiment form.

A wet clutch arrangement for the drivetrain of a vehicle is designated in its entirety by 10 in FIG. 1. This clutch arrangement 10 comprises a housing 12. A housing shell 14 of the housing 12 to be positioned facing a drive unit can be connected by a flex plate subassembly, not shown, or the like, to a drive shaft, i.e., a crankshaft of an internal combustion engine, for example, so as to rotate jointly around an axis of rotation A. A housing shell 16 which is fixedly connected, for example, by welding, to the housing shell 14 on the radially outer side is to be positioned facing a transmission in a drive system or drivetrain and can engage with a radially inner pump hub 18 in a transmission of this kind in order to drive a fluid pump, e.g., an oil pump, arranged in the transmission when the housing 10 rotates around an axis of rotation A. A transmission of this kind, to which the clutch arrangement 10 is preferably connected, is an automatic transmission, for example, a multiple-speed automatic transmission, or an automatic transmission with a continuously variable transmission ratio. An input shaft 20 of a transmission of this kind is shown in FIG. 1.

The clutch arrangement 10 comprises two friction surface formations 22, 24. Friction surface formation 22 is rotatable together with the housing 10 around the axis of rotation A or is provided partially by the housing or the housing shell 14 itself. This forms a friction surface 26 which is located axially opposite a friction surface 28 at a friction element 30. This friction element 30 is fixedly connected, e.g., by riveting, in its radially inner area to a piston element 32 acting as a pressing element. The piston element 32 is in turn connected by a coupling arrangement 34, for example, by a plurality of leaf springs 36 distributed in circumferential direction, to the housing 12, particularly the housing shell 14, so as to be fixed with respect to rotation relative to it but so as to be displaceable relative to it in direction of the axis of rotation A.

The friction surface formation 24 comprises a friction element 38, referred to generally as a lamination, having two friction surfaces 40, 42. Friction surface 40 which is provided, for example, by a friction lining, is located directly axially opposite the friction surface 26 at the housing shell 14, and friction surface 42 which is likewise provided, for example, by a friction lining lies directly axially opposite the friction surface 28 at friction element 30. A friction lining can also be provided at this friction element 30, for example, in the radial area cooperating with the friction element 38. Of course, the friction element 30 can also be constructed with metal material, for example, sheet metal material, where its friction surface 28 is formed.

The friction surface formation 24, i.e., particularly the friction element 38, is connected by a torsional vibration damper arrangement 44 to a driven hub 46 acting as a driven element for rotation around the axis of rotation A. The driven hub 46 has an internal toothing which engages, or can be engaged, in a rotary coupling engagement with a corresponding external toothing of the driven shaft 20.

A coupling disk 48 which is fixed with respect to rotation relative to the friction element 38, e.g., by a toothing engagement, is fixedly connected to a radially outer central disk element 50, e.g., by rivet bolts. This radially outer central disk element 50 forms the input area of a radially outer first damper stage 52. Two cover disk elements 54, 56, which are fixedly connected to one another, form the output area of this radially outer damper stage 52 and simultaneously form the input area of a radially inner second damper stage 56'. A radially inner second central disk element 58 forms the output area of the radially inner second damper stage 56' and is fixedly connected to the driven hub 46. Each of the two damper stages 52, 56' has a damper element arrangement 60 and 62, respectively, for transmitting torque between the respective input area and output area, each of these damper element arrangements 60, 62 comprising, for example, a plurality of helical pressure springs which are arranged successively in circumferential direction and also possibly partially nested one inside the other radially.

The torsional vibration damper arrangement 44 or the driven hub 46 is held in the housing 12 by two bearing arrangements 66, 68 so as to be axially centered with respect to the housing shell 16 on the one hand and a housing hub 64 which is fixed to the housing shell 14 on the other hand. These bearing arrangements 66, 68 can be constructed as rolling bearings or, alternatively, as sliding bearings.

The piston element 32 divides an interior space 70 of the housing 12 into a first spatial area 72, which also contains the torsional vibration damper arrangement 44, and a second spatial area 74 formed primarily between the piston element 32 and the housing shell 14. The piston element 32 is guided so as to be fluid-tight using respective seal elements and in an axially displaceable manner with respect to the housing hub 64 on the one hand and with respect to a cylindrical portion of the housing shell 14 on the other hand.

The wet clutch arrangement 10 is a two-line type and accordingly comprises two fluid flow paths to and from the spatial areas 72, 74. A first fluid flow path 76 leads between the outer circumference of the driven shaft 20 and the inner circumference of the pump hub 18 via corresponding passages 78 in the bearing arrangement 66 into the first spatial area 74 and is accordingly open axially to the first spatial area 72 in an area between the housing shell 16 and the torsional vibration damper arrangement 44. Alternatively or in addition, it would also be possible for the first flow path 76 to continue between the two meshing toothings of the driven hub 46 and the driven shaft 20 and beyond the bearing arrangement 68. A second fluid flow path 80 leads through a central opening 82 of the driven shaft 20 and one or more openings 84 to the second spatial area 74.

In order to separate the two fluid flow paths 76, 80 from one another, the driven shaft 20 can be closed in a fluid-tight manner at its axial end with respect to the housing hub 64 by a seal element 86. Of course, every fluid flow path can have a plurality of channels leading to the same spatial area parallel to one another.

It is possible to adjust the fluid pressure, i.e., generally the oil pressure, of the fluid in the respective spatial areas 72, 74 and, therefore, also the differential fluid pressure in a defined manner by the two fluid flow paths 76, 80. In this connection, it is assumed, for example, that the wet clutch arrangement 10 shown in FIG. 1 is a normally open clutch type, i.e., the piston element 32, together with the friction element 30, is to be preloaded in the releasing direction away from the housing shell 14 and toward the torsional vibration damper arrangement 44. This preloading can be provided, for example, by a correspondingly preloaded installation of the tangential leaf springs 36 of the coupling arrangement 34, which accordingly forms a preloading arrangement 100 for the piston element 32, but can also, of course, be generated by a separate preloading element constructed, for example, as a disk spring which acts between the housing shell 14 or the housing hub 64 and the piston element 32, in which case the tangential leaf springs 36 need only fulfill their function as a rotational coupling. When there is no fluid pressure, i.e., when the housing 12 is emptied of fluid, for example, the piston element 32 with the friction element 30 does not load the friction element 38 of the second friction surface formation 24. The torque transmission connection between the housing 12 and the driven hub 46 is interrupted. When fluid is delivered to the first spatial area 72 via the first flow path 76 in this state, it can flow around the friction surfaces 26, 40 and 28, 42, respectively, which are located at a distance opposite one another, heat can be removed from this area and pass through one or more through-openings 88 in the piston element 32 to the second spatial area 74 and can be removed via the second fluid flow path 80.

If the clutch arrangement 10 is then to be moved into a torque transmitting state, the fluid pressure in the first spatial area 72 is increased, for example, by increasing the fluid delivery rate. This can be realized by correspondingly controlling a valve associated with a fluid pump. Because of the throttling effect of the through-openings 88, an equilibrium of the fluid pressure between the two spatial areas 72, 74 cannot take place, so that a differential fluid pressure is built up in which the fluid pressure in the first spatial area 72 increases over the fluid pressure in the second spatial area 74 which is kept substantially pressureless. Accordingly, a force is built up which is directed counter to the preloading force of the leaf springs 36 and that force acting on the fluid in spatial area 74 due to the influence of centrifugal force. With increasing differential fluid pressure, the piston element 32 together with the friction element 30 supported thereon is moved in the engagement direction, i.e., in the direction away from the torsional vibration damper arrangement 44 and toward the friction element 38 of the second friction surface formation 24. The friction surfaces 26, 40 and 28, 42, respectively, located opposite one another enter into a frictional engagement. Initially, a slip state occurs. The friction heat generated by this is carried along at least partially by the fluid flowing out through the through-openings 88 so that overheating cannot occur. When the clutch torque generated in this way increases beyond the actual driving torque delivered by a drive unit, the slip state is terminated. The two friction surface formations 22, 24 rotate at the same speed without slipping and, by a corresponding control of a transmission downstream in the drivetrain, a vehicle can be operated in different gears or different transmission ratios without having to displace the wet clutch arrangement 10 in the releasing direction again. To release the clutch, this embodiment essentially only requires lowering the fluid pressure again in the first spatial area 72 so that the piston element 32 is displaced together with the friction element 30 in the releasing direction by the action of the leaf springs 36 on the one hand and by the fluid pressure that is generated in the spatial area 74 particularly owing to centrifugal force.

In an alternative embodiment of a two-line system, it could be provided that the second fluid flow path 80 does not lead into the second spatial area 74 but rather leads somewhat farther to the right, with reference to FIG. 1, between the piston element 32 and the torsional vibration damper arrangement 44 into the first spatial area 72. The second spatial area 74 is then kept substantially pressureless, i.e., for example, can be completely emptied of fluid or only partially filled with fluid, which supports the displacement in the releasing direction under the influence of centrifugal force. The fluid supply to the first spatial area 72 can be carried out, for example, via the fluid flow path 76 and the removal of fluid can then be carried out via the fluid flow path 80. Accordingly, it is possible to vary the fluid pressure in the first spatial area to displace the piston element 32 but, at the same time, to provide a defined fluid flow into and out of the housing to remove heat. In order to ensure this partial filling of the second spatial area 74 with fluid which is otherwise not further acted upon by pressure, a leakage opening could be provided in the piston element 32 at a suitable radial position.

In connection with an automatic transmission, the wet clutch arrangement 10 acts primarily as a driving member. In driving mode, it remains closed. This means that the differential fluid pressure between the two spatial areas 72, 74 which is required for generating the clutch torque must also be maintained throughout the entire driving operation due to the normally open characteristics. In order to work as efficiently as possible with respect to energy, it can be provided that the clutch torque generated by building up a differential fluid pressure lies above the actual torque delivered by a drive unit or to be transmitted by the drivetrain only by a predetermined safety margin, for example, with a safety margin of 10% to 20%, in order to prevent the occurrence of a slippage state also during torque fluctuations. Alternatively, it is also possible, of course, to keep expenditure on control as low as possible in that the differential fluid pressure is maintained to the maximum possible extent, i.e., an adaptation to the actually transmitted torque does not take place. For purposes of reducing the opening time of the clutch, it can be useful to adapt the differential fluid pressure to the torque which is actually to be transmitted.

Figure 3:
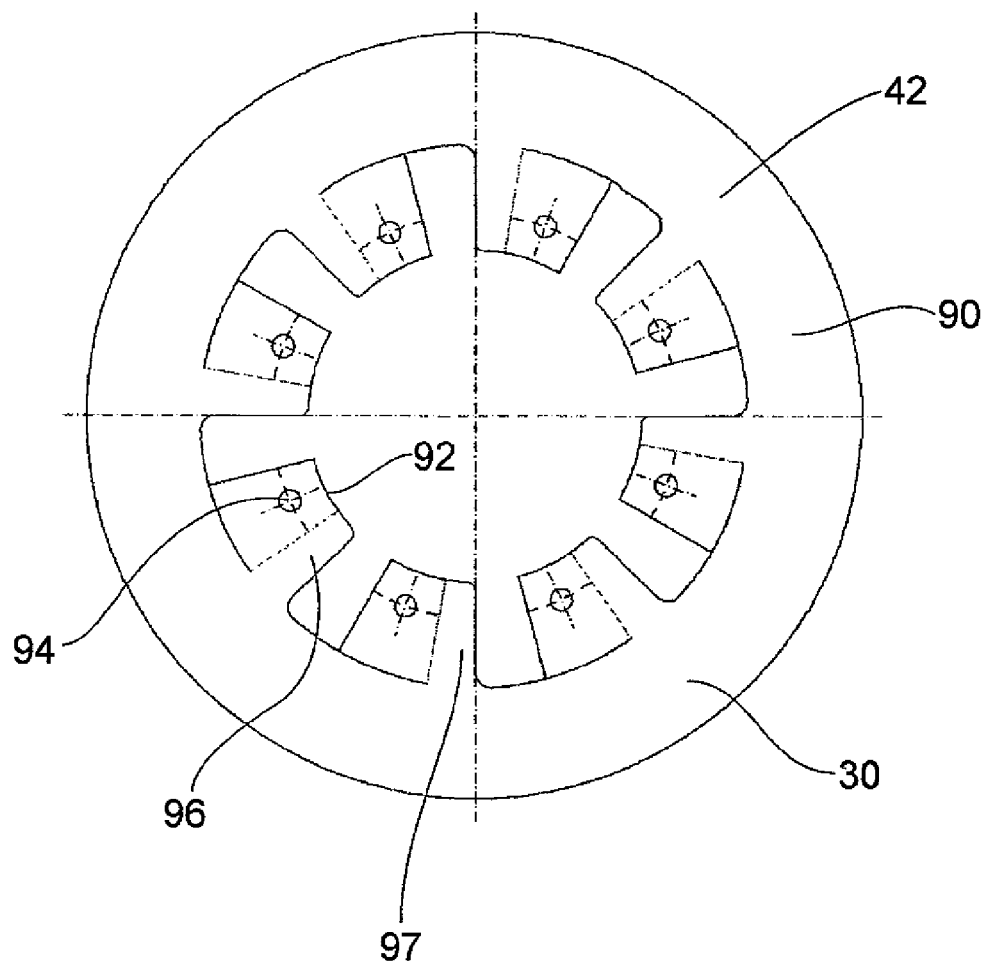
FIG. 3 is an axial view of a friction element connected to a clutch piston in the clutch arrangement shown in FIGS. 1 and 2.

FIG. 3 shows the axial view of the friction element 30 of the clutch arrangement from FIG. 1. A radially outer annular area 90 which can provide the friction surface 42, for example, or can support a corresponding friction lining can be seen from the drawing. Arm-like portions 92 which, on the one hand, provide through-openings 94 for the fastening elements, for example, rivet bolts, which are used for connecting to the piston element 32 are shown on the radially inner side of this annular area. Further, these arm portions have blade-like areas 96, each having a delivery surface 97, which operate rotationally in the manner of a pump to ensure that a fluid circulation flowing around the friction surfaces 26, 40 and 28, 42, respectively, is built up. The torsional vibration damper arrangement 44 acts like a turbine. The fluid flow through the housing 12 from the first spatial area 72 through the through-openings 88 into the second spatial area 72 is then superimposed on this fluid circulation. This fluid circulation is described in more detail with reference to constructional variants shown in FIG. 4f.

In the embodiment form of a normally open type clutch arrangement 10 described above, a reversal in the direction of the fluid flow is not required on principle; that is, the system can be designed in such a way that fluid can only be supplied via the first fluid flow path 76 and can also only be removed via the second fluid flow path 80. For example, if the clutch arrangement 10 should be released when stopping a vehicle, only the delivery rate at which fluid is delivered to the first spatial area 72 need be reduced or the fluid delivery adjusted. The fluid pressure in the first spatial area 72 then decreases so that the differential fluid pressure also decreases in a corresponding manner, and the piston element 32 with the friction element 30 is moved in the releasing direction by the preloading action of the leaf springs 36. However, it should be noted that the system can, of course, also be designed in such a way that the flow direction can be reversed for a faster releasing movement of the piston element 32, i.e., fluid is then conveyed into the second spatial area 74 via the second fluid flow path 80 and can flow out of the first spatial area 72 in a corresponding manner via the first fluid flow path 76. This can also be achieved by a valve arrangement which is associated with a fluid pump, for example, and which can be controlled in accordance with the required pressure ratios.

Figure 2:
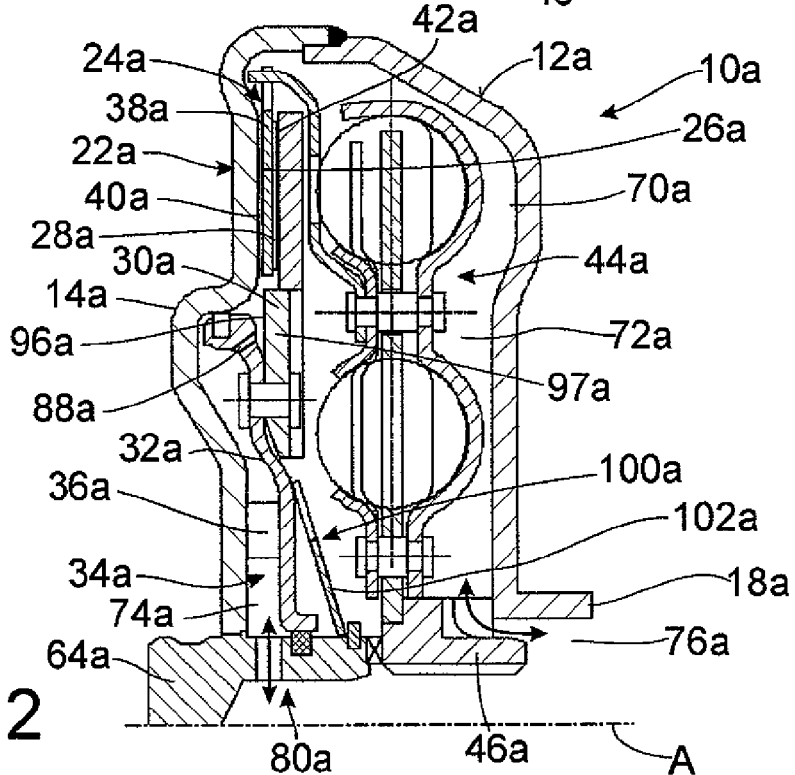
FIG. 2 is a view corresponding to FIG. 1 of an alternative type of arrangement.

An alternative embodiment form of a wet clutch arrangement is shown in FIG. 2. In this case, components whose construction or function corresponds to that of components described above are designated by the same reference numbers to which an "a" is appended. Only the structural and functional differences in relation to the embodiment form according to FIG. 1 will be described in the following.

In the embodiment form shown in FIG. 2, the clutch arrangement 10 is the normally closed clutch type. In FIG. 2, an "a" has been added to the reference designators for components that correspond to the components of FIG. 1. Therefore similar components are not described herein. In this case, a preloading arrangement 100a is provided which comprises, for example, a disk spring 102a which is axially supported with respect to the housing 12a, in this case, the housing hub 64a, on the one hand and with respect to the piston element 32a on the other hand. The preloading arrangement 100a loads the piston element 32a in the direction of the housing shell 14a and in the direction away from the torsional vibration damper arrangement 44a, that is, in the engagement direction. In this constructional variant, the coupling arrangement 34a can be designed in such a way that it only provides the rotational coupling of the piston element 32a but does not introduce a substantial axial force component. In this case, also, it would be conceivable that the preloading force is generated by the coupling arrangement 34a, i.e., the leaf springs 36a pull the piston element 32a in the engaging direction toward the housing shell 14a.

In this construction of the clutch arrangement 10a as a normally closed type, an interruption of torque in the drivetrain when the vehicle is not being operated is not realized in the area of the clutch arrangement 10a. Due to the fact that an automatic transmission must generally be in gear, or the like, to prevent the vehicle from rolling, the transmission must first be put into a neutral position when starting the system, i.e., the flow of torque in the transmission must be interrupted. The drive unit can then be started. The housing 12a also begins to rotate with the driveshaft and to drive a fluid pump with the pump hub 18a. The fluid delivered by the fluid pump is initially conducted into the second spatial area 74a via the second fluid flow path 80a, while the first spatial area 72a communicates with a substantially pressureless reservoir via the first fluid flow path 76a. The fluid pressure in the second spatial area 74a increases in relation to the fluid pressure in the first spatial area 72a until the preloading force of the preloading arrangement 100a is overcome and the piston element 32a is moved in the releasing direction. As soon as the torque transmission connection is interrupted by the decoupling of the two friction surface formations 22a, 24a, the system areas following in the torque flow, in particular the torsional vibration damper arrangement 44a and the input area of the transmission following in the drivetrain, are no longer coupled. When the clutch arrangement 10a is subsequently engaged for starting the vehicle before or after engaging a gear in the transmission, it is necessary to decrease the fluid pressure again in the second spatial area 74a so that the piston element 32a and therefore also the friction element 30a is adjusted in the engagement direction by the action of a disk spring, possibly assisted by a fluid pressure in the first spatial area 72a which now increases.

The preloading arrangement 100a can be designed in such a way that the preloading force generated by it generates a clutch torque which is greater than the maximum driving torque of a drive unit. In this case, no assistance through an increase in the fluid pressure in the first spatial area 72a is required on principle. Accordingly, for engagement it is sufficient to decrease the fluid pressure in the second spatial area 74a, for example, by deliberately draining or gradually connecting the second fluid flow path 80a to a pressureless reservoir. In so doing, a reversal of the direction of fluid flow with the additional introduction of fluid into the first spatial area 72a need not also be carried out. The heat is guided away through the cooling oil flow from the spatial area 74a into the spatial area 72a and, further, via the fluid flow path 76a. When the clutch arrangement 10a is completely engaged, the fluid supply can be adjusted because, on the one hand, the two friction surface formations 22a, 24a no longer slip with respect to one another and, accordingly, no longer generate heat energy and, on the other hand, reinforcement of the preloading arrangement 100a by a differential fluid pressure between the two spatial areas 72a, 74a is no longer required in order to transmit the maximum driving torque. Since the clutch arrangement 10a is not disengaged on principle during normal driving operation of a vehicle because the engagement and disengagement of gears or the changing of the transmission ratio is carried out solely by controlling the automatic transmission, this design is particularly energy efficient because no energy need be expended in practice during the entire driving operation to maintain a differential fluid pressure between the two spatial areas 72a, 74a.

In an alternative construction, it can be provided that the preloading force supplied by the preloading arrangement 100a is less than the maximum driving torque of a drive unit. This means that when the driving torque of the drive unit that is actually delivered is not greater than the clutch torque that can be generated by the preloading action of the preloading arrangement 100a, reinforcement through a differential fluid pressure is not required. However, when the driving torque increases above this clutch torque that can be generated by the preloading arrangement 100a, it is necessary, by increasing the fluid pressure in the first spatial area 72a, i.e., corresponding fluid supply via the first fluid flow path 76a, to build up an additional force by which the piston element 32a or the friction element 30a connected with the latter is loaded in the engagement direction. In order to work in the most energy-efficient manner possible in this design also, the differential fluid pressure can be adjusted in such a way depending upon the driving torque actually delivered by the drive unit that the clutch torque in its entirety lies above the actual driving torque of the drive unit by a predetermined safety margin of, for example, 10% to 20%. An excessively high differential fluid pressure which is not required, per se, for a respective driving state can be prevented in this way. However, in order to minimize expenditure on controlling, it is also possible to work in this case in such a way that the maximum possible differential fluid pressure is built up whenever the clutch arrangement 10a is to be in the engaged state.

With the construction, according to the invention, of a two-line type wet clutch arrangement, it is possible to realize in a simple construction and with simple controlling technique a torque transmission connection between a drive unit and an automatic transmission which, in contrast to hydrodynamic torque converters, cannot deliver any torque reinforcement generated by fluid circulation but which also does not impose any limitation on the rotational speeds of a drive unit that can be achieved in the starting state. Due to the fact that the system components for fluid circulation provided in a hydrodynamic torque converter or fluid coupling, i.e., a turbine, pump and possibly a stator, are not required, the wet clutch arrangement according to the invention has the further advantage that there is more installation space available for the torsional vibration damper arrangement, i.e., the spring volume generally.

In the two-line type construction, instead of providing one or more though-openings connecting the two spatial areas, a deliberate fluid leakage can also be provided in the area of the fluid-tight connection of the piston element or of the friction element with respect to the housing or the driven shaft or driven hub for the passage of fluid between the two spatial areas. If the friction element limits the second spatial area, e.g., by its radially inner area, a deliberate fluid leakage can also be used in the area in which the friction element and piston element adjoin for exchange of fluid between the two spatial areas.

Figure 4:
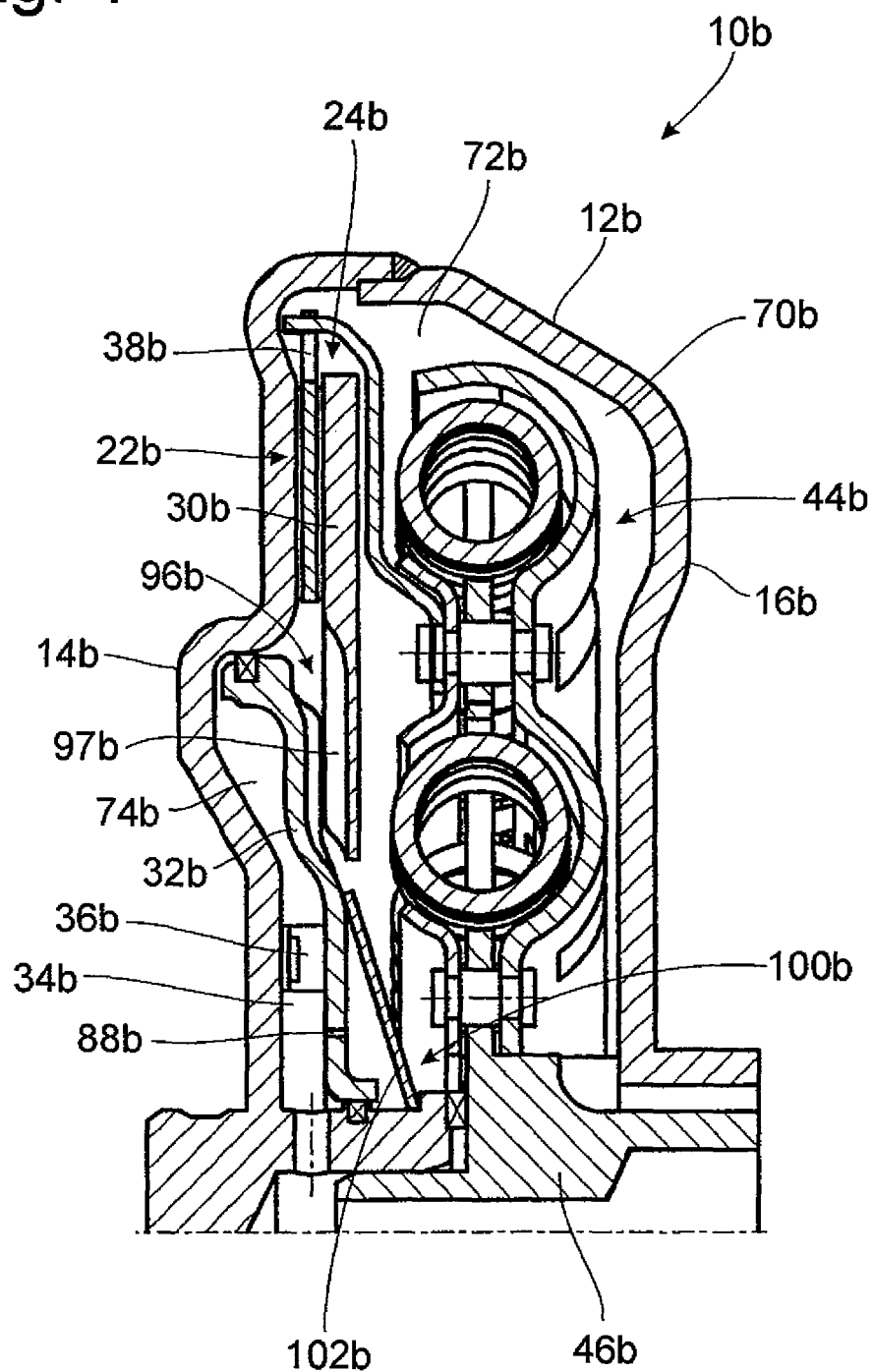
FIG. 4 is a modification of the embodiment shown in FIG. 2.

FIG. 4 shows another embodiment form of a wet clutch arrangement. Components whose construction or function corresponds to that of components described above are designated by the same reference numbers to which a "b" is appended.

The basic construction of the wet clutch arrangement $10b$ in FIG. 4 corresponds to the above description pertaining to FIG. 2, to which reference is had in this regard. Only the substantial differences are described in the following, and the principle of operation of the wet clutch arrangement for generating an internal fluid circulation is illustrated once again.

It will be seen in FIG. 4 that the subassembly comprising the piston element $32b$ acting as pressing element and the friction element $30b$ combined provides delivery elements $96b$ arranged successively in circumferential direction; that is, in every delivery element $96b$, a partial area of the delivery surface $97b$ is formed at the piston element $32b$ and a partial area adjoining it is formed at the friction element $30b$. Accordingly, above all, the size of the effective delivery surface $97b$ in each delivery element $96b$ can be adjusted within a wide spectrum of variations. The delivery surfaces $97b$ and the two partial areas can be provided at the piston element $32b$ and at the friction element $30b$, for example, by shaping corresponding sheet metal parts, but also, of course, by cutting or casting methods of production. Of course, the angle of inclination that may possibly be specified relative to a plane containing the axis of rotation A, for example, relative to the drawing plane in FIG. 4, can also then be adjusted.

If the friction element $30b$ cannot be directly connected to the piston element $32b$, and an annular intermediate element, for example, is required for this purpose and is fixedly connected to the piston element $32b$ on one side and to the friction element $30b$ on the other side, it is entirely possible also to provide at least one partial area of the friction surface $97b$, or of every friction surface $97b$, at this connection element, for example, in connection with a partial area provided at the friction element $30b$ and/or a partial area provided at the piston element $32b$. In this embodiment form, as well as in the other embodiment forms shown herein, it is possible on principle to provide separate delivery members as independent structural component parts at this subassembly, i.e., for example, at the friction element $30b$ and/or at the piston element $32b$ and/or at a connection element, if any, connecting the latter. These delivery members then provide or form the delivery elements with their delivery surfaces.

To promote the fluid circulating effect occurring during rotation, it is advantageous, in addition to the delivery elements $96b$ acting in their entirety as a pump, to also provide subassemblies acting as turbines which then rotate at a different, generally lower, rotational speed. A subassembly of this kind acting as a turbine is, for example, the torsional vibration damper arrangement $44b$, which acts as a braking subassembly under slip conditions, i.e., when the housing $12b$ is rotating rapidly. The friction element $38b$ which rotates at the same rotational speed as the torsional vibration damper arrangement $44b$ can also act as a braking element of this kind. To this end, radially extending channels can be provided in the friction linings provided at this friction element, the fluid delivered by the delivery elements $96b$ flowing through these channels with a corresponding circumferential retardation.

Figure 5:
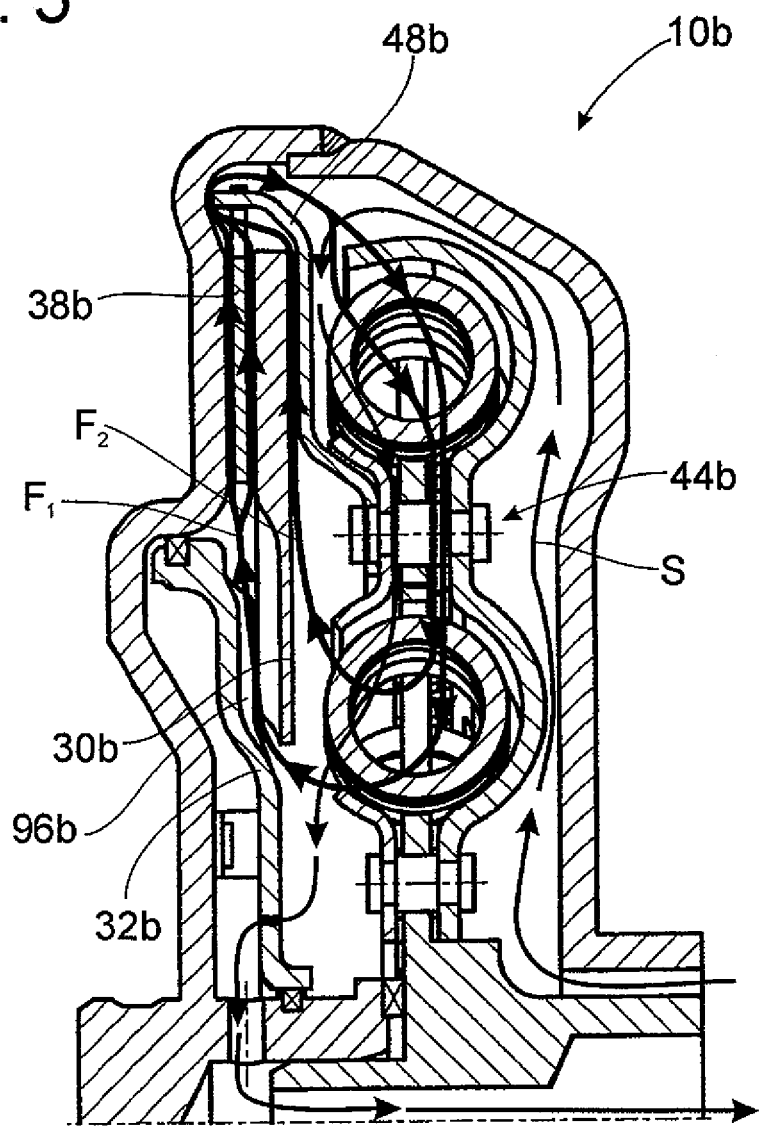
FIG. 5 is a schematic diagram showing the different fluid flows in the clutch arrangement shown in FIG. 4.

The fluid flows and fluid circulation occurring in the interior of this wet clutch arrangement $10b$ can be seen in FIG. 5. It will be seen first that a flow S represents the flow of fluid into and out of the housing caused, for example, by a fluid pump or oil pump arranged in a transmission. This fluid flow, which contributes to the continuous exchange of fluid and, therefore, also to the continuous removal of heat, has a flow rate of about 8 l/min. During relative rotation between the input area, i.e., the housing and all subassemblies rotating with it, and the output area, i.e., substantially the torsional vibration damper arrangement and all of the subassemblies which are fixed with respect to rotation relative to it, a first fluid circulation $F_1$ is formed which also flows around the friction surfaces and friction element and which is conveyed forward and radially outward by the delivery elements $96b$ provided in the area adjoining the piston element $32b$ and friction element $30b$ and is substantially braked by the torsional vibration damper arrangement $44b$ and the channels formed in the friction element $38b$. Depending on the relative rotational speed between the input area and the output area, a fluid circulation which very efficiently cools the surfaces frictionally interacting with one another can have a flow rate of up to 177 l/min or twenty-times the flow rate of flow S. A second fluid circulation $F_2$ is formed substantially in the transitional area between the friction element $30b$ and the coupling disk $48b$. This fluid circulation $F_2$ can be generated in that not only the delivery surfaces $97b$, or areas thereof, shown in FIG. 4 are formed at the friction element 30. Rather, it is possible to form this friction element 30 in an undulating manner in its radially inner area so that the delivery surfaces $97b$ which lead to the fluid circulation $F_1$ and which are shown in FIG. 4 result on the one hand and delivery surfaces which act at the other axial side of the friction element $30b$ and which are not shown in FIG. 4 are provided. These delivery surfaces convey the fluid toward the radially outer side in the volume area between the friction element $30b$ and the torsional vibration damper arrangement $44b$. Another effect contributing to the formation of the fluid circulation $F_2$ is a suction pump effect produced by the fluid circulation $F_1$ at that location where, in FIG. 5, the two partial flows of the fluid circulation $F_1$ combine again radially outside the surfaces which frictionally interact with one another. The fluid circulation $F_2$ can have a flow rate of up to 155 l/min or 15-times the flow rate of flow S. This second fluid circulation $F_2$ could be reinforced by delivery elements which are additionally provided at the side of the friction element $30b$ facing the torsional vibration damper arrangement $44b$ and which are supplied, for example, at delivery members provided at the friction element $30b$ as separate structural component parts.

Of course, the intensity of the respective fluid circulation can be adjusted, if needed, by the quantity and size of the effective delivery elements and by their geometry, i.e., essentially the geometry of the delivery surfaces $97b$. Depending on the demand for delivery surfaces, the choice of where the delivery elements are to be provided can then also be made. To this end, accordingly, the piston element $32b$, the friction element $30b$, a connection element connecting these two elements, or a combination of these elements can be used to provide the delivery surfaces. The housing can also be used to provide corresponding delivery surfaces. In so doing, it must be taken into account that the housing also rotates at the input speed, i.e., at a rotational speed which is greater, particularly under slip conditions, than the rotational speed of the subassemblies acting as braking elements or turbines. To this end, additional delivery members could be provided at suitable positions at the inner side of the housing or could be provided for by a corresponding shaping of the housing for providing the delivery elements with the corresponding delivery surfaces. In general, it has proven advantageous when the geometry, or also the quantity, of the delivery surfaces is selected in such a way that at a driving speed, i.e., a rotational speed of the housing, of about 2000 rpm and a driven speed of about 0 rpm, i.e., at a speed ratio of driven speed to driving speed of about 0, the volume flow generated by the internal fluid circulation is at least twice as great as the volume flow serving for the exchange of fluid, i.e., flow S in FIG. 5.

The intensity of the fluid circulation can also be influenced, for example, by the construction of the friction element 38 (in FIG. 1), 38a (in FIG. 2), 38b (in FIG. 4), 38c (in FIG. 7 which will be described below) or 38d (in FIG. 12 which will be described below) shown in the drawings. This will be explained in the following with reference to the friction elements shown in FIGS. 14 and 15.

In an axial view, FIG. 14 shows a friction element 38c, which carries a friction lining 124c at one or both sides. This friction element 38c is provided for a clutch arrangement, which is preloaded in the closing direction under a fluid pressure generated by centrifugal force. Examples of this are shown in FIGS. 6, 7, 8, and 9 described in the following.

It will be seen that channels 140c are formed in the friction lining 124c, which penetrate this friction lining 124c radially, extend in a slightly curving manner. The radially outer opening area 142c is set back, i.e., lags behind in circumferential direction, in relation to the radially inner opening area 144c and in relation to the rotational direction R of the friction element 38c. In so doing, an angle α between a tangent line $T_a$ at the outer circumference of the friction element 38c and a straight-line extension $V_a$ of the center line M at the outer opening area 142c is less than 90°, preferably less than 60° and, as is shown in FIG. 14, is oriented opposite to the rotational direction R. This means that the extension line $V_a$ extends at an inclination with respect to the radial line $R_a$ opposite to the rotational direction R.

An angle β enclosed between an inner tangent line $T_i$ and an inner extension line $V_i$ is in the range of, e.g., also less than, 90°, but only slightly less, i.e., in the range between 90° and 80°, for example. In this way, it can be achieved that the fluid exiting at that point substantially no longer undergoes a deflection in the outlet area and flows out almost exactly toward the radially inner side. Angle β could also be slightly greater than 90°.

The angle γ which is formed between the radial line $R_a$ leading to the center—with reference to the circumferential extension—of the outer opening area 142c and the corresponding radial line $R_a'$ which leads to the center—with reference to the circumferential extension—of the inner opening area 144c is greater than 0°, for example, in the range of 10° to 30°.

By a construction of this kind, flow separation zones within the channels 140c are successfully prevented. This results in a higher volume flow with the same flow cross sectional surface and, therefore, in an improved removal of the heat occurring therein.

FIG. 15 shows the construction of a friction element 38 for a clutch arrangement, which is preloaded or loaded in the opening direction under the influence of centrifugal force. Variants of this type are shown in FIGS. 1, 2, 4, 6, 10, 11, and 12 or 13. It can be seen that the flow channels 140 likewise extend in a curved manner and lead in the rotational direction with their radially outer opening area 142 in relation to the respective radially inner opening area 144. The channels 140 are oriented in such a way that angle β between the outer tangent line $T_a$ and the extension $V_A$ of the center line M in the radially outer area is approximately 90°, i.e., for example, in the range of 80° to 100° in order to ensure that the fluid which is now flowing radially outward can exit from the channels 140 without deflection. The angle α formed at the inner opening area 144 between the inner tangent line $T_i$ and the inner extension line $V_i$ of the center line M lies within a range of appreciably less than 90°, and preferably less than 60°. The angle γ between the radial line $R_a$ and the radial line $R_a'$ which is offset in rotational direction is also greater than 0° in this case, for example, lies within the range of 10° to 30°.

By this construction of the friction element 38 and of the friction lining 124 provided at the latter or, as the case may be, of two friction linings provided at both axial sides, a higher flow rate and, therefore, a stronger cooling effect can again be provided while preventing a flow separation in the interior of the channels 140.

Figure 6:
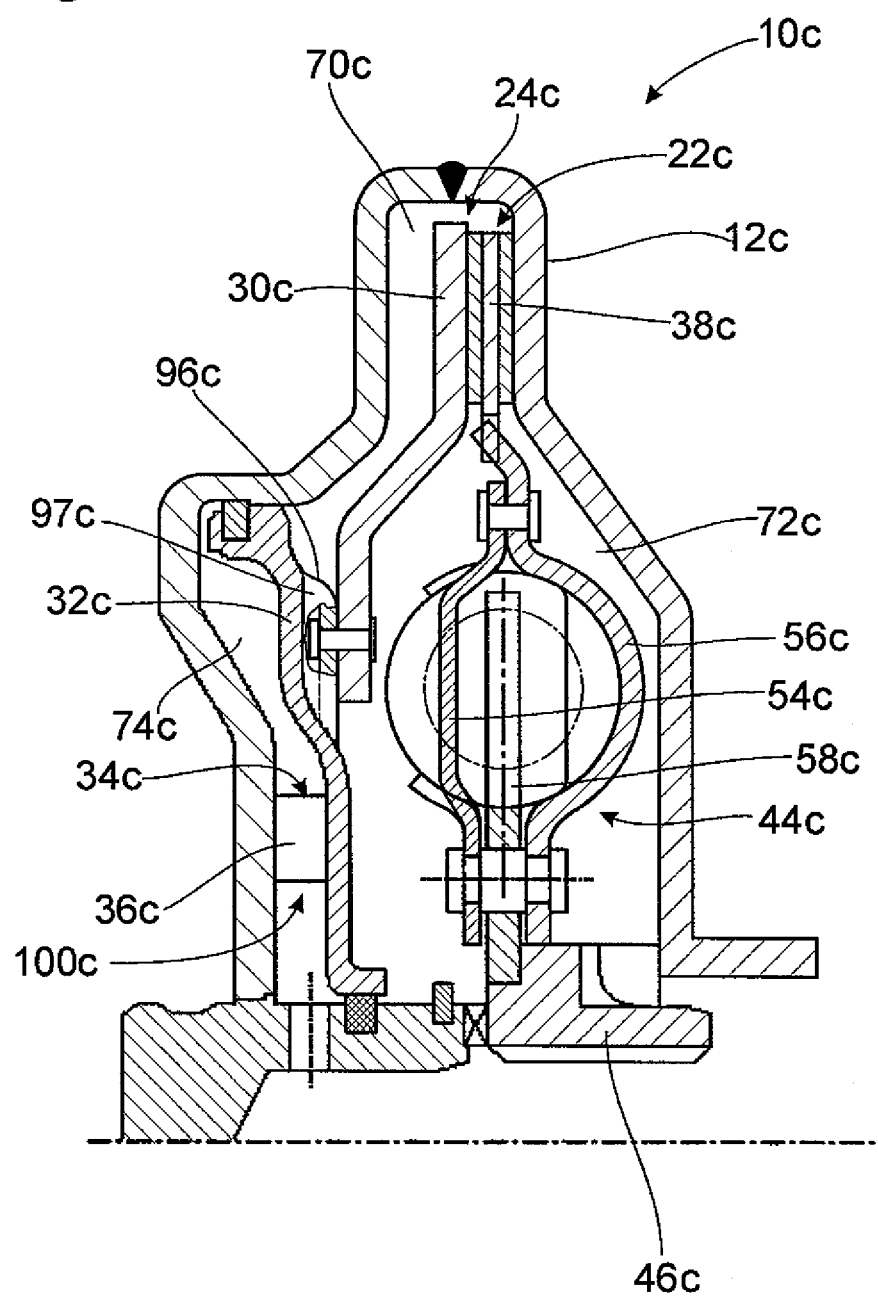
FIG. 6 is another view corresponding to FIG. 1 of an alternative embodiment.

Another embodiment form of a wet clutch arrangement is shown in FIG. 6. In this case again, components or groups of components whose construction or function corresponds to that of components or groups of components described above are designated by the same reference numbers to which a "c" is appended.

First, it can be seen from FIG. 6 that the torsional vibration damper arrangement 44c is constructed in a single row, i.e., it has two cover disk elements 54c, 56c which provide an input area and which are coupled with the friction element 38c by a toothed engagement and a central disk element 58c as an output area which is fixedly connected to the driven hub 46c. It will be seen further that the torsional vibration damper arrangement 44c and the surface areas frictionally interacting with one another are arranged in the same axial area but so as to be staggered radially. This results in a construction, which is very short in axial direction. The friction element 30c reaches radially outward from the area of its connection to the piston element 32c into an annular area of the housing 12c which is kept narrower axially, the friction element 38c with the friction linings provided on it also being received in this housing 12c.

In this embodiment, delivery elements 96c with their delivery surfaces 97c are provided at the piston element 32c, for example, by corresponding axial shaped portions, in the area of the connection of the piston element 32c to the friction element 30c. These two parts can be fixedly connected to one another in the area of the axial shaped portions by riveting.

In the embodiment form in FIG. 6, the surface of the friction element 30c that interacts with the friction element 38c is on the side of the friction element 30c facing the torsional vibration damper arrangement 44c and remote of the second spatial area 74c. This means that the friction element 30c is moved together with the piston element 32c to the right with reference to FIG. 6, i.e., in direction of the torsional vibration damper arrangement 44c, to produce the frictional engagement. This movement can be achieved in that the fluid pressure in the second spatial area 74c is increased relative to the fluid pressure in the first spatial area 72c by a corresponding supply of fluid. Since the second spatial area 74c contains substantially no bulky groups of components and accordingly has an appreciably smaller volume than the first spatial area 72c and since, beyond this, the entire volume of the second spatial area 74c is located appreciably farther inward radially than the first spatial area 72c, it is possible in this constructional variant to carry out engagement processes or filling processes substantially faster particularly in a start phase, i.e., after a long stationary period of the system. This is because it is only required that the second spatial area 74c, which may possibly be partially empty, be filled with fluid and a corresponding fluid pressure built up, whereas in the embodiment forms described above this is required in the first, appreciably larger, spatial area extending radially outside the piston element. The fluid introduced into the second spatial area 74c is loaded by centrifugal force which leads to a pressure acting upon the piston element 32c, which pressure is opposed by a corresponding fluid pressure in the first spatial area 72c resulting from centrifugal force owing to insufficient filling of this first spatial area 72c after the housing 12 has partially emptied. This means that the centrifugal force acting in the rotational state assists in closing or engaging the clutch so that the clutch can be controlled faster particularly in the starting stage of operation. This does not depend on whether the clutch arrangement is a two-line type, three-line type or some other type.

Another advantage of this embodiment is that the component assemblies acting as turbine and braking elements, which rotate more slowly, particularly the torsional vibration damper arrangement 44c or the friction element 38c, do not throttle the fluid flow through the delivery elements 96c, i.e., the fluid circulation $F_1$ described above, as extensively.

Of course, the delivery elements 96c can also be realized in this embodiment, alternatively or in addition, with corresponding delivery surfaces 97c or partial areas thereof at the friction element 30c or delivery members which are additionally provided at the latter or at the pressing element 32c.

Figure 7:
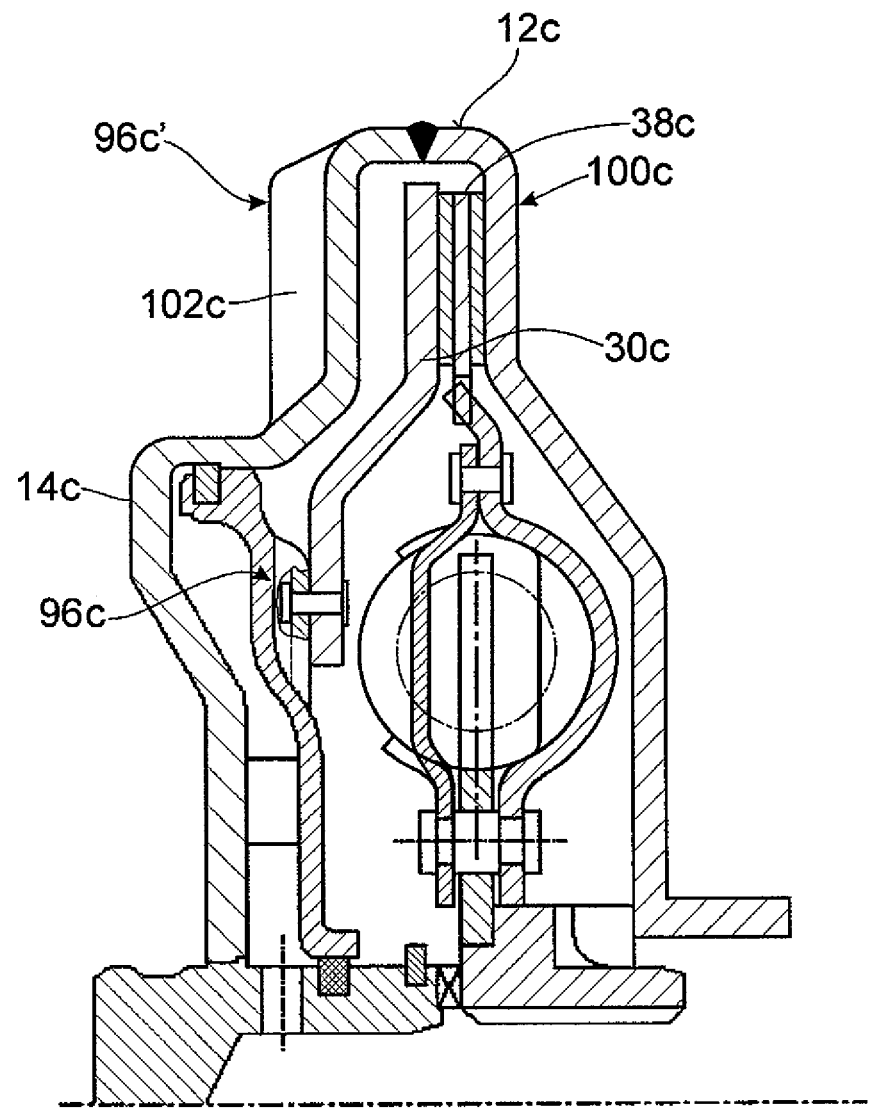
FIG. 7 is a modification of the embodiment shown in FIG. 6.

Another embodiment is shown in FIG. 7. In this case, in addition to the delivery elements 96c provided in the area of the pressing element, delivery elements 96c' are provided as an integral component part of the housing 12c, particularly the housing shell 14c on the engine side, at the radially outer annular area 100c of the housing 12c in which the friction element 38c and the area of the friction element 30c in frictional interaction therewith are also arranged. These delivery elements 96c' are formed by shaped portions 102c of the housing shell 14c on the engine side which provide pump-vane-like surfaces arranged successively in circumferential direction. Delivery elements 96c' reinforce the fluid circulation already generated by the delivery elements 96c and are also capable of generating this fluid circulation by themselves.

It should be emphasized once again that these delivery elements 96c' are not necessarily realized by a corresponding shaping of the housing 12c, but rather can be realized by additional delivery members which are provided at the housing 12c and which have corresponding delivery elements providing the delivery surfaces.

Figure 8:
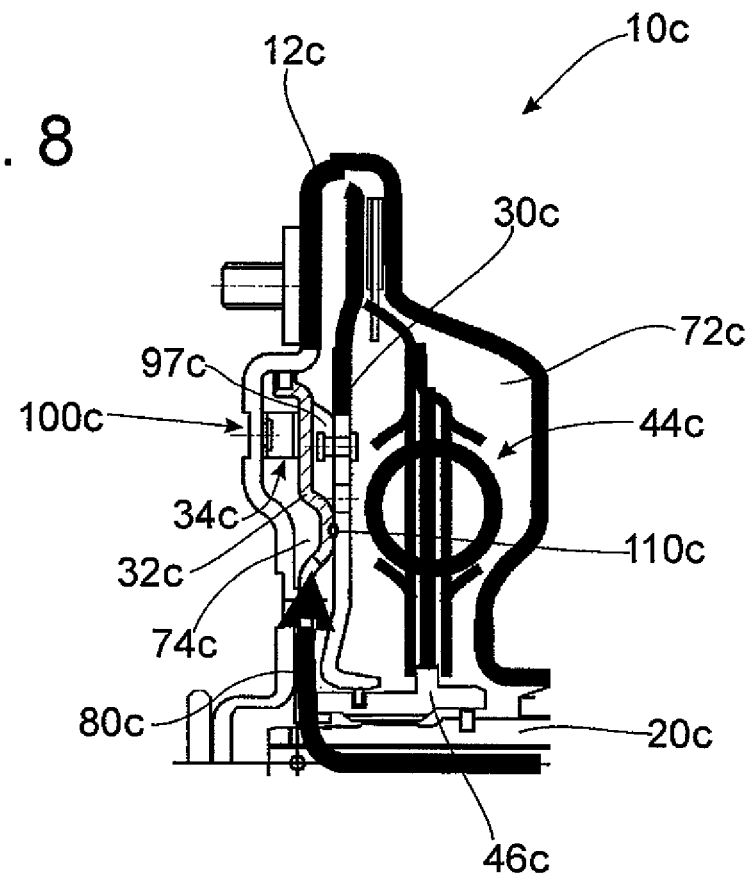
FIG. 8 is a modification of the embodiment shown in FIG. 6 to illustrate a fluid supply.

The preceding embodiment forms of a wet clutch arrangement have been described substantially with reference to so-called two-line systems in which a fluid flow path is provided respectively for the first spatial area and the second spatial area or as a design in which two fluid flow paths are possibly provided only for the second spatial area for supplying or removing fluid in the required flow direction. Of course, the different constructional variants, particularly also with respect to the generation of the internal fluid circulation, can also be used in other systems. For example, with reference to a constructional variant, which substantially corresponds to that shown in FIG. 6 with respect to construction, FIG. 8 shows the construction of a single-line system. In this case, there is only one fluid flow path 80c in the second spatial area 74c, which fluid flow path 80c, indicated by a bold arrow, also runs through the transmission input shaft 20c. There is no fluid flow path which could be actively used to generate an external fluid circulation, i.e., flow S in FIG. 5, associated with the first spatial area 72c. The supply of fluid to the first fluid space 72c can be carried out, for example, through an opening or leakage in the area of the piston element 32c or friction element 30c or by a connection to a transmission or a transmission oil sump. By increasing the fluid pressure in the second spatial area 74c, the friction element 30c can be displaced for engaging the clutch arrangement 10c, which is supported in this embodiment form in that the fluid present in the second spatial area 74c is subjected to centrifugal force during rotary operation, which generates a pressure that loads the piston element 32c with the friction element 30c in the engagement direction.

FIG. 8 shows another aspect of a variation which can, of course, also be realized in the other embodiment forms. In this case, the second spatial area 74c is limited not only by the piston element 30c but also, in addition, and specifically in the radially inner area, by the friction element 32c that extends into radially inward. In the present example, this friction element 32c is connected so as to be fluid-tight with respect to, but rotatable relative to, the outer circumference of the driven hub 46c by the intermediary of a seal element, but could also, of course, be connected in a fluid-tight manner with respect to the outer circumference of the transmission input shaft 20c or a corresponding driven shaft. The piston element 32c is connected in a fluid-tight manner so as to be axially movable with respect to the housing 12c only on the radially outer side. The piston element 32c and the friction element 30c are fixedly connected to one another by a rivet connection, wherein a sealing formation 110c can be provided to achieve a fluid-tight closure of the second spatial area 74c in the area adjoining these two elements. This sealing formation 110c can be realized, for example, by an interposed elastic seal element but, alternatively, also by a weld, for example, a laser weld.

The advantage of this constructional variant consists in that the force generated for displacing the friction element 30c, which is substantially provided by the differential fluid pressure between the two spatial areas 72c and 74c, does not act exclusively on the piston element 32c but rather partially also directly on the friction element 30c and, therefore, the connection between these two elements is relieved. This is advantageous, above all, in the normally open design because a portion of the closing force then acts directly on the friction element 30c rather than through the connection of the piston element 32c with the friction element 30c.

Figure 9:
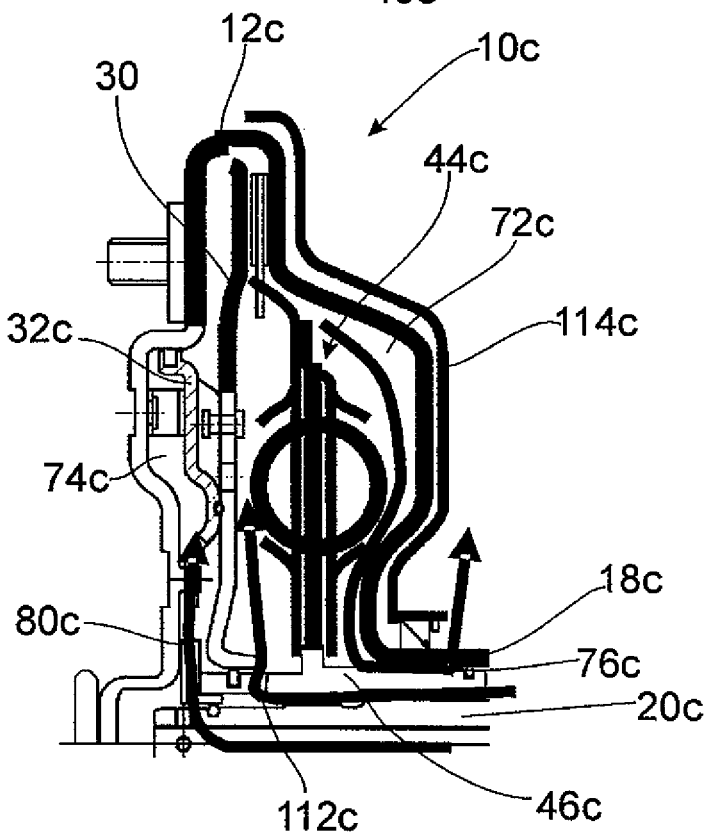
FIG. 9 is a view corresponding to FIG. 8 for describing an alternative fluid supply.

FIG. 9 is another alternative for supplying fluid constructed as an expanded two-line type. The fluid flow path 80c to the second spatial area 74c can be seen again. Also shown are the fluid flow path 76c, which in this case is guided out of the first spatial area 72c, and another fluid flow path 112c which leads between the driven shaft 20c, i.e., the transmission input shaft, for example, and the driven hub 46c and through one or more openings in the latter into the first spatial area 72c, specifically in an area axially between the torsional vibration damper arrangement 44c and the pressing element 30c and the friction element 32c. In this variant, a disk-like sealing element 114c made of sheet metal, for example, is provided in addition. This sealing element 114c can basically follow the contour of the housing 12c and is connected in the radially inner area so as to be fluid-tight, but rotatable, with respect to the pump hub 18c formed at the housing and is supported so as to close in a fluid-tight manner on the radially outer side, for example, at a transmission casing or a clutch bell housing, or the like. The latter protects the housing 12c or the clutch arrangement 10c from the fluid removed from the first spatial area 72c via the fluid flow path 76c. The fluid removed via the fluid flow path 76c can then be removed via a connection opening into a transmission sump in a wet space formed, for example, outside a transmission casing.

Another variant can be provided by the three-line type construction in which fluid can be supplied to and removed from the second spatial area 74c via the fluid flow path 80c. The fluid flow paths 76c, 112c lead to a fluid supply system which has a fluid pump and a fluid sump and which is formed, for example, in a transmission casing. A three-line system of this kind is advantageous particularly in the construction, also shown in FIG. 9, in which the clutch arrangement 10c inclines toward closing, i.e., engagement, under the influence of centrifugal force and the supply of fluid into the second spatial area 74c.

It should be emphasized once again with respect to the different fluid supply variants that they are fundamentally independent from the internal construction of the clutch arrangement, particularly from the construction of the torsional vibration damper arrangement, the piston element and the friction element connected to the latter so that, of course, the other constructional variants shown herein can also be constructed with the appropriate type of fluid supply system as required.

Figure 10:
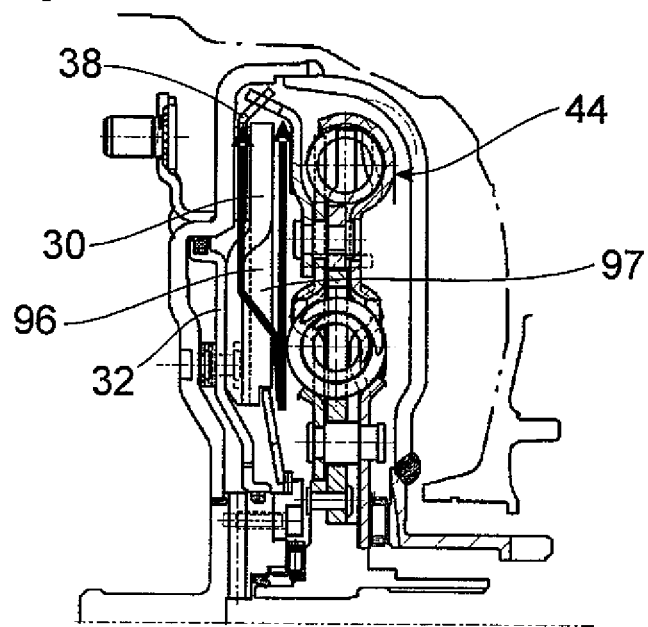
FIG. 10 is a modification of the embodiment shown in FIG. 1.

FIG. 10 corresponds in substantial areas to the embodiment form shown in FIG. 1. The drawing shows the two-row torsional vibration damper arrangement 44, the piston element 32 which is connected to be substantially fluid-tight and axially movable on the radial inner side and radial outer side, and the friction element 30 which is fixedly connected to the latter. This is connected to the piston element 32 again by a rivet connection, for example, and is shaped in such a way in its radially inner area, which does not provide a friction surface, that it provides a plurality of delivery elements 96 and respective delivery surfaces 97 successively in circumferential direction. Accordingly, in this case also, for example, all of these delivery surfaces 97 are provided at the friction element 32. This friction element 32 can be undulating in circumferential direction in its radially inner area or can be constructed with areas arranged to be axially offset relative to one another in order to provide these delivery surfaces 97. As a result, a respective cooling oil flow is generated at the two axial sides of the friction element 32 as is illustrated in FIG. 10 by a divided arrow. This reinforces the internal fluid circulation and cools the friction element 32c in its radially outer area at the axial side which is remote of the friction element 38 and which faces the torsional vibration damper arrangement 44.

Figure 11:
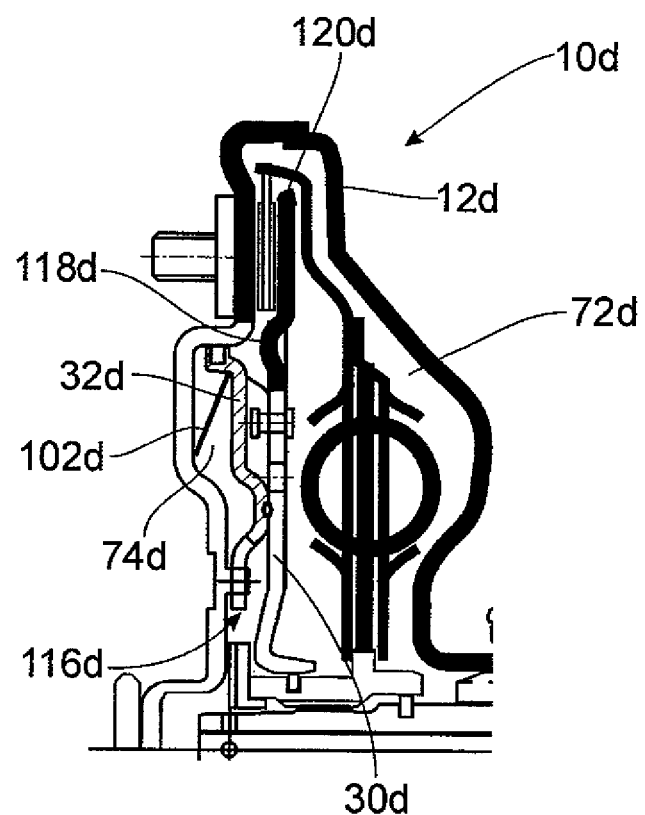
FIG. 11 is a view of another clutch arrangement for describing design variations.

FIG. 11 is another modified constructional type in which components whose construction or function corresponds to that of components described above are designated by the same reference numbers to which a "d" is appended.

FIG. 11 is a variation in which the fluid pressure in the first spatial area 72d is increased relative to the fluid pressure in the second spatial area 74d for engaging the clutch arrangement 10d. The piston element 32d is preloaded or axially loaded by the disk spring 102d in the releasing direction. The rotational coupling between the piston element 32d and the housing is carried out by a positive engagement 116d formed by toothing formations at the radial inner area of the piston element 32d. The second spatial area 74d is again axially limited in its radially inner area by the radially inner portion of the friction element 30d. The disk spring 102d is centered at an axial step of the piston element 32d in the area of its radially outer circumference, which is advantageous because the smallest radial change in size of the disk spring 102d occurs when axially loaded in this area. This type of centering of the disk spring in its radially outer area can also be seen, for example, in the embodiment form in FIG. 10, where this disk spring is supported at the radially inner end area of the associated friction element.

It can further be seen in FIG. 11 that in the friction element 30d, which can be formed as a shaped sheet metal part, a bent axial shaped portion 118d is formed radially inside the friction surface provided at the friction element 30d. This bent axial shaped portion 118d produces a reinforcement of the friction element 30d. Alternatively or in addition, an axial shaped portion 102d, for example, in the shape of a bent area, can be formed radially outside the frictionally acting surface region of the friction element 30d so that this can also contribute to the stiffening of the friction element 30d.

Figure 12:
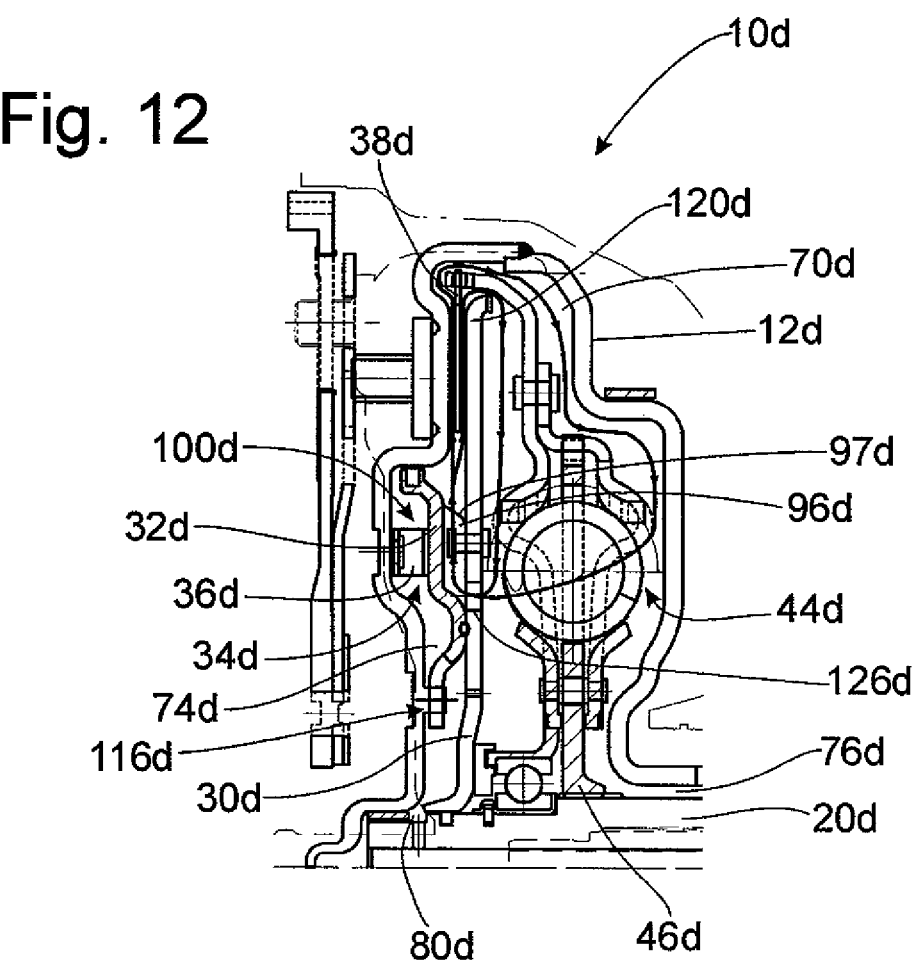
FIG. 12 is another view of an alternative clutch arrangement.

The embodiment shown in FIG. 12 corresponds in substantial areas to the construction described above with reference to FIG. 11. It can be seen again in this instance that the second spatial area 74d is limited by the piston element 32d and the radially inner area of the friction element 30d. This friction element 30d now contacts the outer circumference of the transmission input shaft 20d acting as driven shaft and is provided in its radially outer area with the bent axial shaped portion 120d in order to provide corresponding stiffening in this area. The rotational coupling between the piston element 32d and the housing 12d is generated substantially by the positive engagement at the radially inner end area of the piston element 32d.

Figure 13:
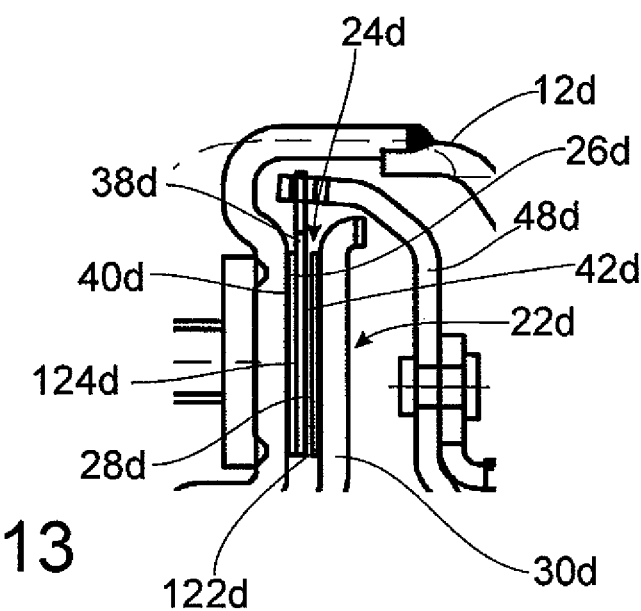
FIG. 13 is a detailed view of the friction surface formations of the clutch arrangement shown in FIG. 12.

It will be seen from the enlarged view in FIG. 13 that a friction lining 122d providing the friction surface 28d is provided at the area of the friction element 30d which becomes frictionally active. This is located axially opposite the friction surface 42d formed at the friction element 38d, and the friction element 38d does not carry or have a friction lining in this area. On its other axial side, the friction element 38d has a friction lining 124d, which supplies the friction surface 40d which in turn frictionally interacts with the friction surface 26d formed at the housing 12d.

The delivery elements 96d with their respective delivery surfaces 97d are provided at the piston element 32d and generate a fluid flow radially outward during rotation of the housing 12d, i.e., they act basically as a pump. This pumping effect can be reinforced by grooves or channels formed in the friction lining 122d of the friction element 30d, extend radially outward and can likewise act as pumps with their circumferential limiting surfaces. The friction element 38d can act as a braking element or turbine element with its friction facing 124d and the grooves or channels formed at the latter. This accordingly results in the fluid circulation shown in FIG. 12, which divides into two partial flows in the area of the friction element 38d, and can accordingly efficiently remove the friction heat occurring at both sides of the friction element 38d. The fluid flow travels substantially radially outward and flows partially between the housing 12d and the torsional vibration damper arrangement 44d toward the radially inner side. This is shaped in an open manner particularly in the area of the springs acting as damper elements and thus makes it possible for the circulating oil to pass through axially so that this fluid flow between the torsional vibration damper arrangement 44d and the housing 12d can combine with a fluid flow traveling substantially between the friction element 30d and the torsional vibration damper arrangement 44d toward the radially inner side and is guided in direction of the delivery elements 96d through one or more openings 126d of the friction element 30d which is guided entirely toward the radially inner side. It is noted that this design of the torsional vibration damper arrangement which is open for the flow of fluid can, of course, also be selected in this way in the other embodiment forms shown herein, particularly also those having two torsional vibration damper areas which are arranged so as to be radially staggered. This axially open design can be achieved, for example, in that the various disk elements supporting the damper springs have spring windows where the damper springs are arranged.

It should be noted that the arrangement of the friction linings which is shown in FIG. 13 and which, of course, can also be implemented in the other embodiment forms can also be varied insofar as no friction lining at all is provided at the friction element 38d, i.e., this is formed as a substantially planar metal or sheet metal disk. The two friction linings can then be provided at the friction element 30d on one side and at the housing 12d at the other side.

In the constructional variants shown in FIGS. 12 and 13 and, of course, also in the other constructional variants, the friction element 38d, or, insofar as more than one is provided, each of the friction elements 38d of the second friction surface formation 24d which are constructed like laminations can be undulating in circumferential direction or plate-shaped, i.e., substantially conically aligned. This affords advantages particularly with respect to the drag torque, which is generated in this way. A very good decoupling from control oscillations is also achieved similar to a lining suspension in clutch disks of dry friction clutches. The modulation of the clutch torque during an engagement process is also made possible in this way. This is advantageous, above all, when the housing 12d is completely filled with fluid. The disadvantages produced by the speed dependency of the closing pressure acting on the piston element 32d can also be compensated in this way. This is brought about in that, as is shown in the different embodiment forms, the piston element 32d is preloaded in the engagement or releasing direction by a spring, or the like, which then prevents it from closing and opening when the second spatial area 74d is kept pressureless and substantially only the influence of centrifugal force is present. This spring force can be used to compensate for the touch point characteristic. To this end, however, it is necessary that the preloading spring can become operative by way of the piston element during the engagement process, i.e., during the building up of the clutch torque, i.e., the building up of the clutch torque is carried out while an axial movement of the piston element 32d or of the friction element 30d is still being carried out. Above all, in opening systems, i.e., when the piston element 32d is loaded in the releasing direction due to centrifugal force, the falling touch point characteristic depending on centrifugal force can be compensated by the further deflection of the preloading spring, i.e., for example, the disk spring 102d in FIG. 11. In a closing system, i.e., in which the piston element is preloaded in the engaging direction, in which the pressure generated depending on centrifugal force, particularly in the second spatial area, also supports, or even causes, the closing movement, a preloading spring that preloads in the releasing direction has the function of ensuring that the clutch is held open until a determined lower limiting speed can be reached so that the vehicle cannot start automatically.

In conclusion, it is noted once again that the possible technical constructions shown in the various embodiment forms can, of course, be combined with one another. Variations in different areas are also conceivable, e.g., the design of the piston element and of the friction element in an integral component part, for example, produced in a casting process or in a sheet metal shaping process. The various functional groups, particularly the delivery surfaces, can be shaped simultaneously in the production process, i.e., during casting or shaping, but can, of course, also be produced subsequently, for example, by chip-removing machining.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A clutch arrangement, comprising:
a housing having an interior space and configured to be filled with fluid;
a first friction surface formation configured to be rotatable with the housing around an axis of rotation;
a second friction surface formation configured to be rotatable with a driven element around the axis of rotation;
a pressing element configured to be rotatable with the housing around the axis of rotation that divides the interior space of the housing into a first spatial area and a second spatial area, the pressing element is movable with respect to the housing for producing and canceling a frictional engagement between the first friction surface formation and the second friction surface formation based at least in part on the fluid pressure in the first spatial area and the fluid pressure in the second spatial area;
a fluid supply system for at least one of the first spatial area and the second spatial area comprising at least one of a first fluid flow path for the first spatial area and a second fluid flow path for the second spatial area, wherein the fluid is supplied to the respective spatial area via the respective fluid flow path and the fluid is removed from the associated spatial area via at the respective fluid flow path; and
at least one delivery element configured to generate an internal fluid circulation, wherein the second friction surface formation comprises a friction element connected to the pressing element, and a delivery surface is provided at least one of at least partially at the friction element and at an intermediate element connecting the friction element to the pressing element, and
wherein the delivery element forms at least one of:
an integral component part of the pressing element,
a friction element of the second friction surface formation connected to the pressing element, and
an intermediate element connecting the friction element to the pressing element, and
wherein the delivery element is provided at a delivery member that is fixedly connected thereto.

2. The clutch arrangement according to claim 1, wherein the fluid supply system is a two-line type having a respective fluid flow path each for the first spatial area and the second spatial area.

3. The clutch arrangement according to claim 1, further comprising at least one through-opening in the pressing element for the exchange of fluid between the first spatial area and the second spatial area.

4. The clutch arrangement according to claim 1, wherein the fluid supply system is a three-line type with a fluid flow path for the second spatial area and two fluid flow paths for the first spatial area.

5. The clutch arrangement according to claim 1, wherein the fluid supply system is a single-line type with one fluid flow path for the second spatial area.

6. The clutch arrangement according to claim 1, wherein the fluid supply system is an expanded two-line type further comprising: a fluid flow path for the second spatial area; and a fluid supply path and a fluid discharge path for the first spatial area.

7. The clutch arrangement according to claim 1, wherein at least the second friction surface formation is arranged in the first spatial area.

8. The clutch arrangement according to claim 1, further comprising an axially elastic coupling arrangement configured to couple the pressing element with the housing for rotation around the axis of rotation.

9. The clutch arrangement according to claim 8, wherein the coupling arrangement comprises a plurality of leaf springs.

10. The clutch arrangement according to claim 9, further comprising a preloading arrangement associated with the pressing element configured to preload the pressing element in a direction in which frictional engagement of the first friction surface with the second friction surface is produced.

11. The clutch arrangement according to claim 10, wherein the preloading arrangement comprises a disk spring unit that axially preloads the pressing element with respect to the housing.

12. The clutch arrangement according to claim 8, wherein the preloading arrangement comprises an axially elastic coupling arrangement.

13. The clutch arrangement according to claim 1, further comprising a preloading arrangement associated with the pressing element configured to preload the pressing element in a direction in which the frictional engagement of the first friction surface formation with the second friction surface formation is canceled.

14. The clutch arrangement according to claim 1, further comprising a torsional vibration damper arrangement configured to couple the second friction surface formation the driven element for rotation around the axis of rotation.

15. The clutch arrangement according to claim 14, wherein the torsional vibration damper arrangement is arranged in the first spatial area.

16. The clutch arrangement according to claim 15, wherein the torsional vibration damper arrangement radially overlaps at least one of the first friction surface formation and the second friction surface formation at least partially.

17. The clutch arrangement according to claim 1, wherein a plurality of delivery elements are provided successively in circumferential direction.

18. The clutch arrangement according to claim 1, wherein the at least one delivery element comprises a radially and an axially extended delivery surface which is rotatable with the housing around the axis of rotation.

19. The clutch arrangement according to claim 18, wherein the delivery surface is provided at least partially at the pressing element.

20. The clutch arrangement according to claim 1, wherein the delivery surface is provided at least partially at the pressing element.

21. The clutch arrangement according to claim 1, wherein the delivery surface is provided on at least two of the elements comprising: the pressing element, the friction element and, a connection element.

22. The clutch arrangement according to claim 1, wherein the at least one delivery element at least one of forms an integral component part of the housing and is provided at a delivery member secured to the housing.

23. The clutch arrangement according to claim 1, wherein a fluid flow generated by the internal fluid circulation is at least twice as great as a fluid flow in and out of the first spatial area generated by the fluid supply system for the first spatial area at a rotational speed of the housing in the range of 2000 rpm and at a rotational speed of the driven element in the range of 0 rpm.

24. The clutch arrangement according to claim 1, wherein the second friction surface formation comprises a friction element connected to the pressing element, and the second spatial area is limited by at least one of: the pressing element and the friction element and a connection element connecting the pressing element to the friction element.

25. The clutch arrangement according to claim 1, wherein at least one friction surface formation of the first friction surface formation and second friction surface formation, comprises at least one axially elastic friction element.

26. The clutch arrangement according to claim 25, wherein the least one axially elastic friction element, comprises at least one of an undulating and plate-like shape.

27. The clutch arrangement according to claim 1, wherein at least one friction surface formation of the first friction surface formation and second friction surface formation comprises at least one friction element with at least one friction lining providing a friction surface, and at least one opening for the passage of fluid is provided in at least one friction lining.

28. The clutch arrangement according to claim 1, wherein the pressing element comprises at least one opening for supplying fluid to the area of the friction surface formations.

29. The clutch arrangement according to claim 1, wherein at least one friction surface formation of the first friction surface formation and second friction surface formation comprises a plurality of friction elements.

30. The clutch arrangement according to claim 1, wherein a volume of the first spatial area is greater than a volume of the second spatial area, and the fluid can be supplied to the second spatial area via the second fluid flow path to produce frictional engagement of the friction surface formations.

31. A drive system for a vehicle comprising a drive unit, an automatic transmission and a clutch arrangement in the torque transmission path between the drive unit and the automatic transmission the clutch arrangement comprising:
a housing having an interior space and configured to be filled with fluid;
a first friction surface formation configured to be rotatable with the housing around an axis of rotation;
a second friction surface formation configured to be rotatable with a driven element around the axis of rotation;
a pressing element configured to be rotatable with the housing around the axis of rotation that divides the interior space of the housing into a first spatial area and a second spatial area, the pressing element is movable with respect to the housing for producing and canceling a frictional engagement between the first friction surface formation and the second friction surface formation based at least in part on the fluid pressure in the first spatial area and the fluid pressure in the second spatial area;

a fluid supply system for at least one of the first spatial area and the second spatial area comprising at least one of a first fluid flow path for the first spatial area and a second fluid flow path for the second spatial area, wherein the fluid is supplied to the respective spatial area via the respective fluid flow path and the fluid is removed from the associated spatial area via at the respective fluid flow path; and at least one delivery element configured to generate an internal fluid circulation, wherein the second friction surface formation comprises a friction element connected to the pressing element, and a delivery surface is provided at least one of at least partially at the friction element and at an intermediate element connecting the friction element to the pressing element, and wherein the delivery element forms at least one of:
- an integral component part of the pressing element,
- a friction element of the second friction surface formation connected to the pressing element, and
- an intermediate element connecting the friction element to the pressing element, and wherein the delivery element is provided at a delivery member that is fixedly connected thereto.

32. The drive system for a vehicle according to claim 31, wherein a clutch torque which is generated by a preloading action of a preloading arrangement is greater than a maximum driving torque of the drive unit.

33. The drive system according to claim 31, wherein a clutch torque which is generated by a preloading action of a preloading arrangement is less than a maximum driving torque of the drive unit.

34. The drive system according to claim 33, wherein a differential fluid pressure is adjusted between the first spatial area and the second spatial area in a driving state of the drive system that the clutch torque of the clutch arrangement such that there is a predetermined safety margin above the actual driving torque.

35. The drive system according to claim 34, wherein the predetermined safety margin is in the range of 5% to 30%, of the actual driving torque of the drive unit.

36. The drive system according to claim 35, further comprising a spring element that exerts a force on the pressing element sufficient to transmit at least a portion of a maximum engine torque.

37. The clutch arrangement according to claim 36, wherein the preloading arrangement comprises an axially elastic coupling arrangement.

* * * * *